(12) United States Patent
Franklin et al.

(10) Patent No.: US 10,482,922 B1
(45) Date of Patent: Nov. 19, 2019

(54) DATA RECORDING METHOD AND APPARATUS

(71) Applicant: Amazon Technologies, Inc., Seattle, WA (US)

(72) Inventors: Paul David Franklin, Seattle, WA (US); Mark R. Sieklucki, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/218,378

(22) Filed: Dec. 12, 2018

(51) Int. Cl.
*G11B 27/36* (2006.01)
*G11B 20/18* (2006.01)
*G11B 21/10* (2006.01)
*G11B 21/00* (2006.01)
*G11B 15/20* (2006.01)
*G11B 21/08* (2006.01)
*G11B 5/008* (2006.01)

(52) U.S. Cl.
CPC .......... *G11B 20/1833* (2013.01); *G11B 15/20* (2013.01); *G11B 21/006* (2013.01); *G11B 21/088* (2013.01); *G11B 21/103* (2013.01); *G11B 5/00813* (2013.01)

(58) Field of Classification Search
CPC .......... G11B 5/00; G11B 27/36; G11B 20/18; G11B 5/584; G11B 5/588

USPC ................ 360/25, 31, 53, 74.4, 74.5, 77.12
See application file for complete search history.

(56) References Cited

U.S. PATENT DOCUMENTS 9,449,628 B2 * 9/2016 Biskeborn .......... G11B 5/00817

OTHER PUBLICATIONS

Wikipedia, "Shingled magnetic recording," Sep. 11, 2013, retrieved Apr. 18, 2019, from https://en.wikipedia.org/wiki/Shingled_magnetic_recording, 3 pages.

* cited by examiner

*Primary Examiner* — Nabil Z Hindi
(74) *Attorney, Agent, or Firm* — Davis Wright Tremaine LLP

(57) ABSTRACT

A tape drive allows for an increased track density by partially overlapping adjacent tracks as each successive track is written. Each successive track overwrites a portion of the width of the previous track, thereby reducing the width of the previous track. This process can be applied repeatedly thereby producing an arrangement of shingled data tracks across the width of the tape. In an embodiment, single-pass verification of data written in this manner is accomplished using a head assembly with two read heads per track. A first read head positioned behind the write head verifies that the data written is correct, and a second read head positioned over the previous track verifies that data on the previous track remains intact after being partially overwritten.

20 Claims, 18 Drawing Sheets

US 10,482,922 B1

DATA RECORDING METHOD AND APPARATUS

BACKGROUND

Data storage is an important problem in the field of computing. Many data storage technologies have been developed over the years, including solid state, optical, and magnetic storage techniques. Each technology has faced different challenges, but in general, developers of storage devices have attempted to increase data storage density, decrease access speed, and reduce costs as much as possible. Solid state storage devices generally provide rapid access to stored data, but are relatively expensive (per unit of data stored) when compared to magnetic or optical storage technologies. Magnetic disks are generally able to store more data than solid state memories at lower cost, while providing moderate access speeds. Magnetic tape is often used for archiving large amounts of data because it provides vast amounts of long term storage (due in part to the large surface area provided on a magnetic tape), albeit with a relatively slower access rate.

BRIEF DESCRIPTION OF THE DRAWINGS

Various techniques will be described with reference to the drawings, in which.

DETAILED DESCRIPTION

Figure 1:
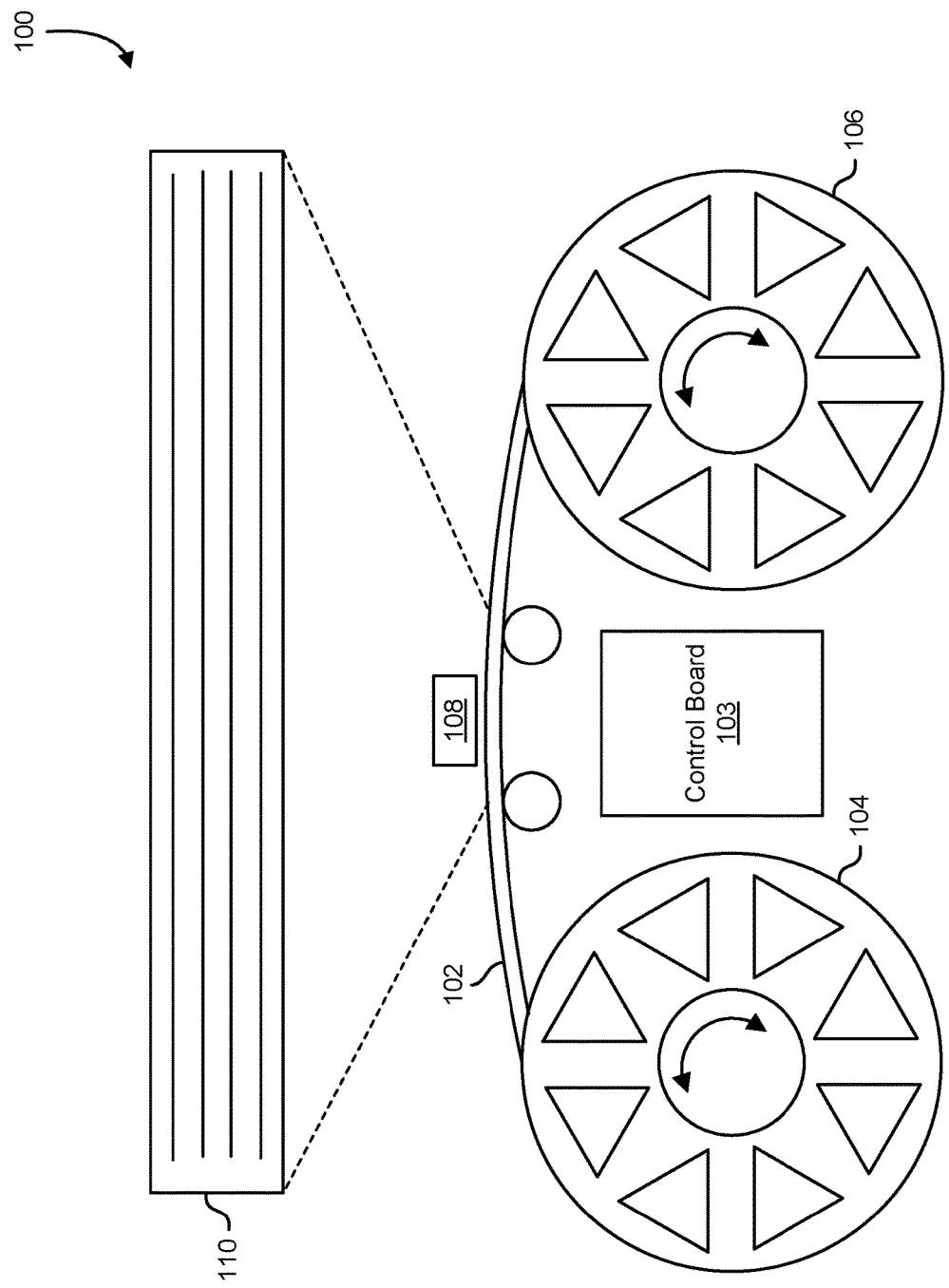
FIG. 1 shows an illustrative example of a magnetic tape drive having a head assembly that is capable of reading and writing a plurality of data tracks, in an embodiment.

The present document describes a tape drive and head assembly that allows for increased performance of data storage and retrieval. In some examples, the head assembly facilitates concurrent reading and writing such that data that is to be overwritten by a write head can be read using a read head during the same pass of the media. In another example, the tape drive includes a head assembly and head-positioning mechanism that allows tracks of data to be written in an overlapped or shingled pattern. By writing data in a shingled pattern, the density of tracks may be increased, thereby allowing more tracks (and more data) to be stored on a given magnetic tape. Some embodiments combine these features into a single head assembly that is capable of reading data that is about to be overwritten from a plurality of data tracks, writing data to the plurality of data tracks in a shingled pattern, and even verifying the written data, in a single pass of the tape.

In general, a tape drive includes a mechanism to handle magnetic tape media in a reel-to-reel format where the magnetic tape is unwound from a source reel and wound onto a pickup reel. In some examples, both reels are part of a cartridge that holds the tape, and in other examples, the source reels and pickup reels are mounted and stored separately. The tape drive draws the tape across a head assembly that houses a number of read and write heads. In an embodiment, a tape drive stores data on a number of parallel tracks using one or more write heads and reads data using one or more read heads. The read and write heads may be mounted to a movable unit called the head assembly. In some examples, the head assembly is coupled to an actuator, servo motor, or positioning mechanism that allows the assembly to be positioned across the width of the tape under the control of a tape drive controller. In some examples, the head assembly is positioned with a servo motor in an open-loop manner. In other examples, servo information written to the magnetic tape is used to position the head assembly using closed-loop control (positioning based on a position determined by reading the servo information on the tape itself).

In various examples, a tape drive records data in a series of tracks arranged lengthwise on the media. Tracks may be read in either or both directions. For example, some tape drives will read a first track in one direction, then reverse the direction of the tape and read another track in the opposite direction. This procedure generally avoids having to rewind the tape to read or write another data track. Depending on the number and arrangement of read and write heads in the head assembly, more than one track may be written or read at a time. Some tape drives include a positioning mechanism that allows the head to be moved across the surface of the tape to read different tracks. Other tape drives include a plurality of heads that span the width of the magnetic tape, and particular tracks are read by selecting a corresponding head on the head assembly. The data storage capacity of a magnetic tape is generally proportional to the writable area of the tape surface (length times width), times the linear bit density (bits per inch), times the track density (tracks per inch). Therefore, it is desirable to increase the linear bit density and the track density to provide a large storage capacity for a given tape size.

In many examples, a read head of a head assembly is capable of reading a narrower track than a write head is able to produce. Therefore, in an embodiment, in order to increase the track density that can be produced by a tape drive, a tape drive is provided that partially overlaps the writing of adjacent data tracks. The resulting track pattern produces a series of tracks that are narrower than any single track. In the present document, the resulting arrangement of data tracks is referred to as an overlapped or shingled track pattern. For a sequence of shingled tracks, the last track written is the track width produced by the write head, but the track width of the earlier tracks is reduced by the amount of overlap of each subsequent track. The amount of overlap can be controlled by the tape drive by way of head selection or by adjusting the position of the head assembly. In one example, a tape drive writes a first track to a magnetic tape. After writing the first track, the tape drive reverses the tape direction and advances the write head by half the width of the first track. Writing the next track overwrites half the first track and leaves a remaining first track with half the width of the second track. This process is repeated when writing the third track, and the tape drive overwrites half the second track and leaves half of the second track intact. Fine read elements are provided in the head assembly which are capable of reading the resulting narrower tracks. The resulting tape drive produces a final track density that is not limited by the minimum track width that can be produced by a write head. In various examples, track density may be increased (resulting in greater data density) by decreasing the track width to the minimum track width that can be read by a read head.

The generation of a shingled right pattern can be facilitated by the layout of write heads on the head assembly. In an embodiment, the head assembly includes a plurality of write heads positioned across the width of the magnetic tape and staggered along the length of the magnetic tape. For example, the write heads may be staggered diagonally across the width of the tape such that each write head overwrites a portion of the data written by a previous head. In this way, the tape drive can write data to a plurality of the write heads in a single pass of the magnetic tape to produce a shingled track pattern. If the direction of the tape is reversed, the same head can produce a shingled track pattern with a reversed overlap but a similar track density. In this way, data throughput of the tape drive during write operations is greatly increased.

To increase the reliability of data retention, the accuracy of write operations is generally verified by reading back the previously written data. To facilitate this, in various embodiments, a read head is positioned behind the write head which reads the data just written to ensure that the data has been properly stored on the magnetic tape. When producing a shingled write pattern, each write of a track causes part of the previous track to be overwritten. Various embodiments include an additional read head positioned on the head assembly for reading and verifying the undisturbed portion of the track being partly overwritten. If the write operation damages the track being partly overwritten by overwriting too much of the track's width, the error will be detected by the additional read head. Possible causes of a write error include imprecise tape feeding, spooling, or alignment, mechanical shock to the tape drive, or damage to the servo mechanism or data.

Some embodiments include a head assembly with a read head positioned in front of the write head. This configuration allows the user to read data before it is overwritten by the write head. This can be useful in a variety of situations. In one example, data to be stored is provided to the tape drive by a user, the tape drive writes the information to the magnetic tape and then returns any data that was overwritten to the user. This returned data can be stored in another location, written to another location on the magnetic tape, or discarded by the user. The presence of the read head in front of the write head allows this operation to be performed in a single pass of the media over the head assembly and avoids the need to rewind the tape.

In some embodiments, the head assembly includes both leading read heads positioned in front of the write heads, and trailing read heads positioned behind the write heads. Such configurations allow a tape drive to recover data about to be overwritten and also verify the written data in a single pass. In some embodiments, the write heads may be staggered across the width of the tape, allowing data tracks to be produced in a shingled pattern.

As one skilled in the art will appreciate in light of this disclosure, certain embodiments may be capable of achieving certain advantages, including some or all of the following: (1) increasing the data storage capacity of a magnetic tape by increasing the number of allowable data tracks, (2) greatly reducing the time required to modify data stored on a magnetic tape by allowing concurrent reads and writes of a track without rewinding, and (3) allowing a subset of shingled tracks to be rewritten in a single pass of the tape.

FIG. 1 shows an illustrative example of a magnetic tape drive having a head assembly that is capable of reading and writing a plurality of data tracks, in an embodiment. In an embodiment, a tape drive 100 provides a mechanism for reading and writing information to and from a magnetic tape 102. The tape drive 100 includes a control board 103. The control board is a computer system having a processor and memory containing executable instructions that, as a result of being executed by the processor, allow the control board to control various aspects of the tape drive operation. The control board provides an electrical interface to which a client computer system can be attached. In various examples, the electrical interface may be a parallel, serial, fiber-optic, or wireless interface. Using the electrical interface, client computer system is able to send commands that cause the tape drive 100 to read and write data to the magnetic tape 102. Specific embodiments of the control board may include electrical interfaces such as Small Computer System Interface ("SCSI"), Serial Attached SCSI ("SAS"), Universal Serial Bus ("USB"), or Fibre Channel interfaces.

Under the control of the control board, the tape drive 100 transfers the magnetic tape 102 between a first reel 104 and a second reel 106 and over a head assembly 108. Each reel is connected to a motor that is under the control of the control board. The tape drive 100 is able to move the tape in two directions by either winding the magnetic tape 102 off of the first reel 104 and onto the second reel 106, or by winding the magnetic tape 102 off of the second reel 106 and onto the first reel 104. In the present document, the reel from which the magnetic tape 102 is being unwound is referred to as the source reel, and the reel to which the magnetic tape 102 is being wound is called the pickup reel. The reels on which the magnetic tape 102 reside are generally removable from the tape drive 100. In some examples, the first reel 104 and the second reel 106 may be part of a single integrated unit called a cartridge or cassette. Examples of magnetic tape cartridges include digital audiotape ("DAT") cartridges and linear tape-open ("LTO") cartridges. In other examples, the first reel 104 and the second reel 106 may be separate assemblies that are independently removable from the tape drive 100.

The head assembly 108 includes a number of read heads, write heads, or combined read/write heads that are capable of writing and reading data to the magnetic tape 102. In some implementations, the head assembly 108 is connected to a servo motor or armature that allows the head assembly 108 to be moved across the width of the magnetic tape 102 under the control of the control board 103. In some examples, positioning of the head assembly is accomplished using an open-loop stepper motor. In other examples, positioning of the head assembly is performed using a servo system where servo information read from the magnetic tape 102 by the head assembly 108 is used to determine the position of the head assembly 108 across the width of the magnetic tape 102. Using this position information, the control board 103 adaptively moves the position of the head assembly 108 to the desired position. In yet another example, the head assembly 108 is in a fixed position and the control board 103 adjusts the transverse position of the magnetic tape 102 by adjusting a guide or roller.

In various implementations, the tape drive 100 produces a data track layout 110 having a plurality of substantially parallel data tracks along the length of the magnetic tape 102. The plurality of tracks may include one or more servo tracks used for determining the position of the head assembly 108 across the width of the magnetic tape 102. In some examples, the servo tracks may include encoded position information that identifies a position along the length of the tape. In another example, the servo tracks include fine servo information that can be used to detect the position of the head assembly within a particular track. In some implementations, the find servo information is an analog quadrature code.

The present document describes various embodiments in which the head assembly 108 allows an increased number of tracks to be written to the magnetic tape 102. In some examples, the control board 103 supports operations that read and write data to the magnetic tape 102 in a single pass. Such operations include operations where data to be written is provided by a client computer system, and the control board 103 causes the data to be written to the magnetic tape 102 and returns to the client computer system any data that was overwritten by the write operation.

Figure 2:
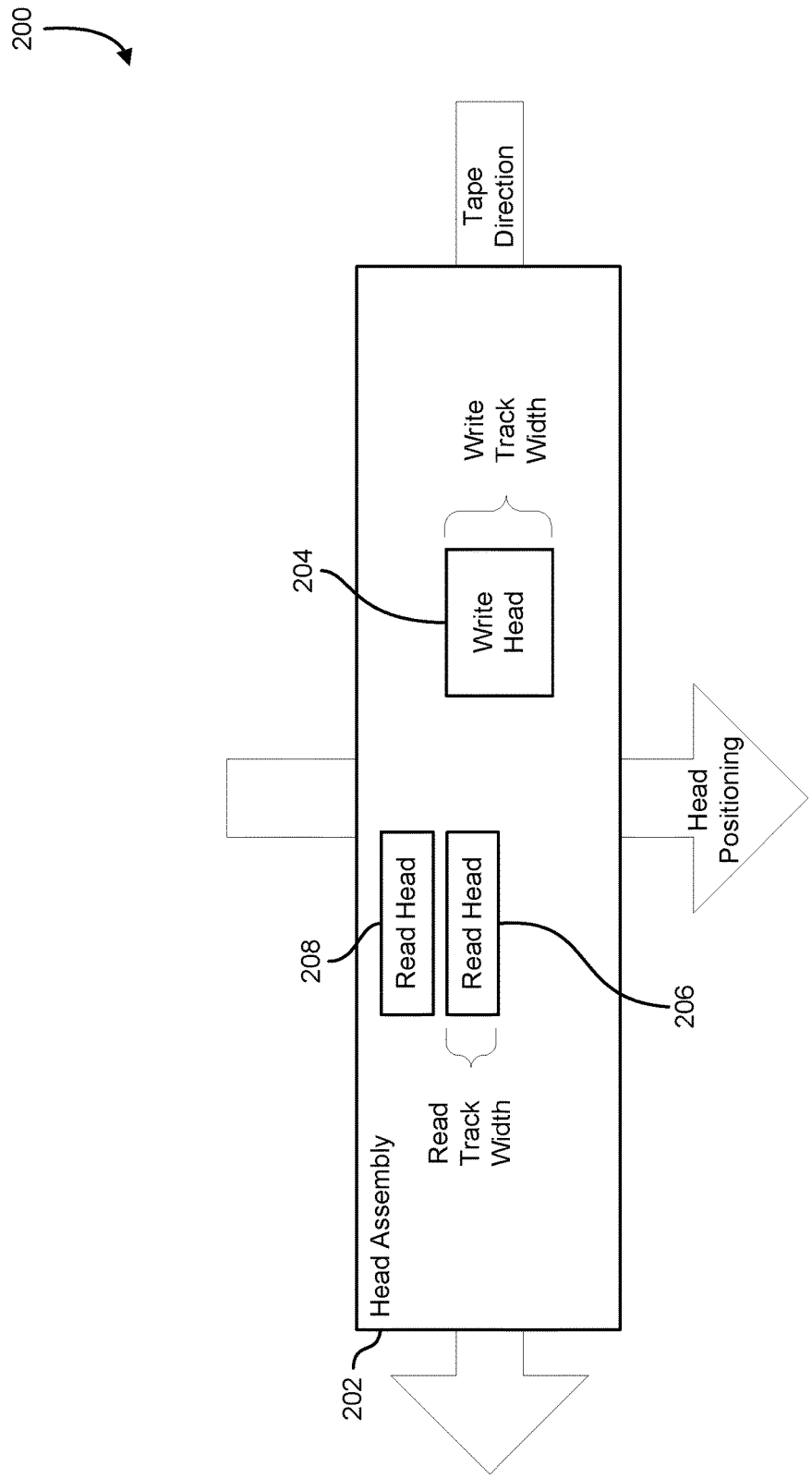
FIG. 2 shows an illustrative example of a head assembly that has a write head and a read head positioned to allow verification of written data, in an embodiment.

FIG. 2 shows an illustrative example of a head assembly that has a write head and a read head positioned to allow verification of written data, in an embodiment. A head layout diagram 200 illustrates an arrangement of read and write heads on the head assembly 202. The diagram illustrates the position of the read and write heads on the surface of the head assembly 202 that is exposed to a magnetic tape having a plurality of data tracks. In an embodiment, as shown in FIG. 2, the magnetic tape is drawn across the surface of the head assembly 202 from right to left.

The head assembly 202 is connected to a mechanism that allows the control board of a tape drive to move the head assembly 202 across the width of the magnetic tape. This allows the tape drive to read and write a plurality of parallel tracks to the magnetic tape in successive passes. In some implementations, after writing a track to the magnetic tape, the control board rewinds the tape, advances the head assembly 202 across the width of the magnetic tape (downward as illustrated in FIG. 2), and writes the next track to the magnetic tape. The amount that the tape drive advances the head assembly 202 controls the distance between adjacent tracks. In general, by positioning the tracks closer to each other, more tracks can be written on the magnetic tape, thereby allowing for larger amounts of data to be stored on the tape.

As the magnetic tape passes a write head 204, a control board of a tape drive energizes the write head 204, inducing a magnetic field that writes data to the magnetic tape. The width of the data track produced by the write head 204 is represented by the vertical dimension of the box representing the write head 204. In the illustrated example, the width of the data track written by the write head 204 is roughly twice the width of the track width that can be read by the illustrated read heads. However, in various examples, the resulting track width may be limited by a combination of the accuracy with which the head assembly 202 may be positioned over the magnetic tape and the width of the read head. The head assembly 202 includes a first read head 206 and a second read head 208. The first read head 206 is positioned so as to read half of the data track written by the write head 204. The second read head 208 is positioned to read data of the previous track adjacent to the track just written by the write head 204.

If the amount that the head assembly 202 is advanced across the width of the tape is less than the width of the track generated by the write head 204, each subsequent track will partially overwrite the previous data track. The data on the previous data track may still be recovered provided that the read head is capable of distinguishing the magnetic signal on the remaining narrower data track. By writing tracks in this overlapping pattern, each individual track can be narrower than the width written by the write head 204. This produces a higher track density and allows a greater data storage capacity on the magnetic tape.

In many embodiments, the data written by the write head 204 is verified by the tape drive by reading the data just written by the write head 204 with the first read head 206. In addition, in some examples, the previous track partially overwritten by the data just written is verified with the second read head 208. The arrangement of the read heads relative to the write head 204 allows the head assembly 202 to perform the write operation and both verifications in a single pass. This arrangement allows the tape drive to confirm that the data written with the write head 204 is properly written to the tape, and that the position of the data on the tape has not overlapped the previous track to an extent that would render the previous track unreadable.

The arrangement of heads on the head assembly 202 is an illustrative example, and other head arrangements are possible based on the width of the available read heads. For example, the head assembly 202 may include a read head that is one-third the width of the write head 204, and adjacent tracks can be written by advancing the head assembly the width of the narrower read head. Subsequent data tracks overwrite two-thirds of the previous track, producing a final track width of approximately one-third the width of the write head 204.

Figure 3:
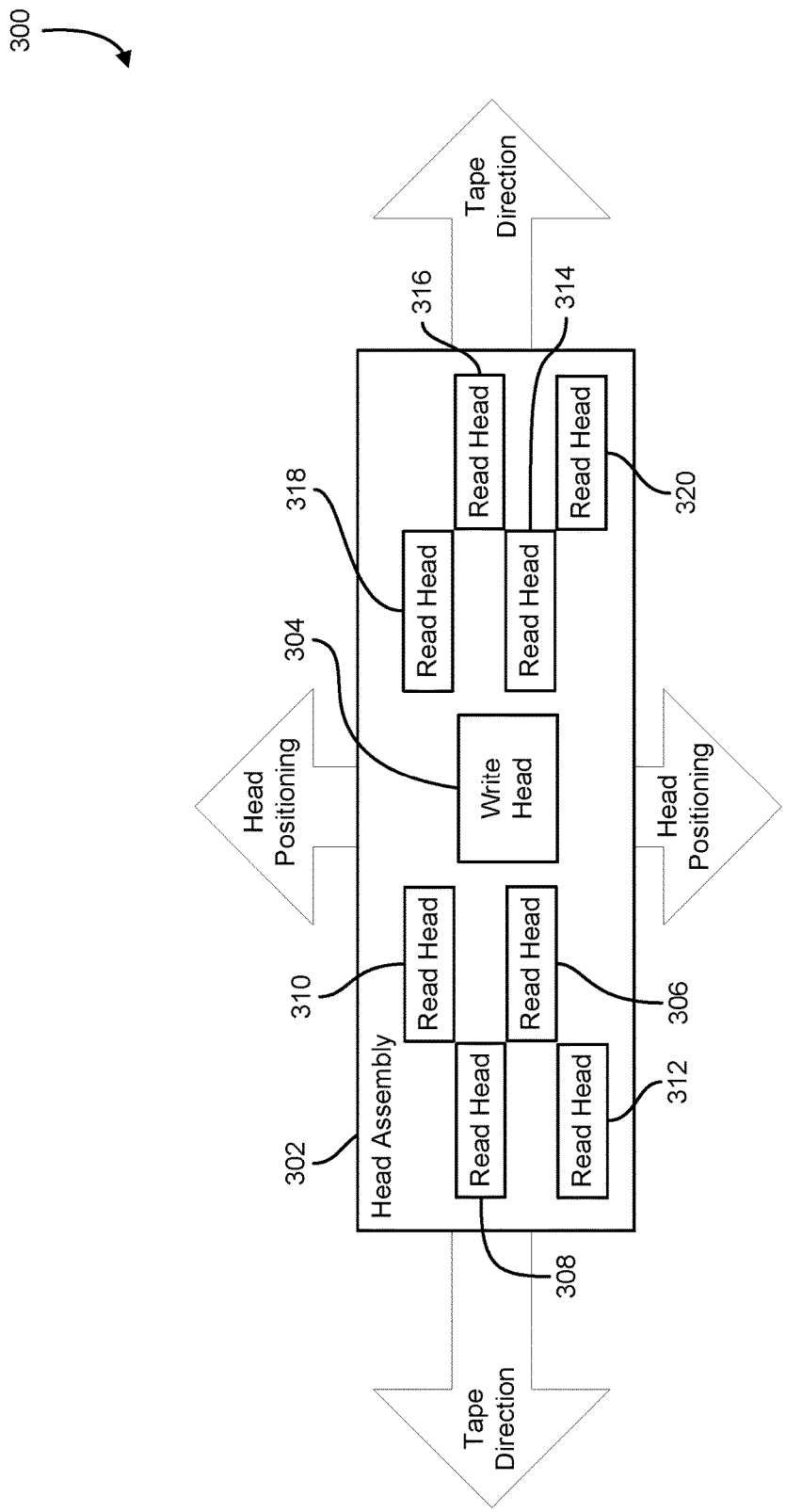
FIG. 3 shows an illustrative example of a head assembly that includes a write head, and two read heads that allow data to be verified when the media is moved in either direction, in an embodiment.

FIG. 3 shows an illustrative example of a head assembly that includes a write head and two read heads that allow data to be verified when the media is moved in either direction, in an embodiment. A diagram 300 illustrates an embodiment of a head assembly 302 having a number of read and write heads. The head assembly 302 is part of a tape drive capable of reading and writing data to a magnetic tape. The head assembly 302 is mounted to a servo motor or actuators that allow the tape drive to move the head assembly across the width of the magnetic tape. The tape drive positions the head assembly 302 to write and/or read a plurality of data tracks which are spread across the magnetic tape. In addition to moving the head across the width of the magnetic tape, the tape may be advanced across the surface of the head assembly 302 in a forward or reverse direction as indicated in FIG. 3.

In the embodiment illustrated in FIG. 3, the head assembly 302 has a head pattern similar to that illustrated in FIG. 2 but adds additional heads to create vertical and horizontal symmetry. The symmetry allows the head assembly 302 to generate a shingled track pattern similar to the pattern generated by the head assembly illustrated in FIG. 2. In addition, the arrangement of read and write heads on the head assembly 302 allows similar operations to be performed in both directions of tape movement and also allows tracks to be overlapped across the magnetic tape from either edge. For example, an overlapped track pattern may be written and verified with tracks written from the right edge of the tape to the left edge of the tape or from the left edge of the tape to the right edge of the tape. This provides greater flexibility in track arrangement and may increase write performance by reducing the amount of head movement required. In addition, by allowing overlapped tracks to be written in either direction, the need to rewind the tape may be eliminated or reduced in some examples.

In one example of a write operation, the tape moves from right to left across the surface of the head assembly 302. A client computer system provides the tape drive with data to be written to the magnetic tape. The tape drive, under the control of a control board, buffers the incoming data and then records the data using a read head 304. After the tape passes the write head 304, the tape passes a set of read heads that includes a first read head 306, a second read head 308, a third read head 310, and a fourth read head 312. The data just written by the write head 304 is read using the second read head 308. The previous data track is confirmed to be intact by reading the data on the previous data track using the third read head 310. The writing of the data, the verification of the written data, and the verification of the previous track are accomplished with a single pass of the magnetic tape over the head assembly 302. After completing the write operation to the current track, the head is advanced (downward in the implementation illustrated in FIG. 3).

In an embodiment, if additional data remains to be written, the following data track can be written by reversing the direction of the magnetic tape. When writing data in the reverse direction, the tape drive utilizes the write head 304 and a second set of read heads that includes a fifth read head 314, a sixth read head 316, a seventh read head 318, and an eighth read head 320. When writing in the reverse direction, data is written using the write head 304, and after writing the tape passes the second set of read heads. The data just written is verified using the sixth read head 316, and the data remaining from the previous track is verified to be intact using the seventh read head 318. Note that in some examples, when verifying the data from the previous track, the data may be read in the reverse order from which it was written. In some examples, additional verification heads may be provided that verify the track previous to the previous track (two tracks back) so that verification occurs in the same order as the data was written.

The various embodiments allow successive tracks to be written by moving the head assembly 302 in either direction (for example up or down in FIG. 3) to advance to the next track. If the track is moved upwards to advance to the next track, verification of the data just written and of the previous track occurs with a different set of read heads. For example, if the magnetic tape is moving right to left, the first read head 306 performs the verification of the data just written with the write head 304, and the fourth read head 312 performs the verification of the previous data track. If the magnetic tape is moving from left to right, the fifth read head 314 is used to verify the data written with the write head 304, and the eighth read head 320 is used to verify data on the previous track.

The layout of the read and write heads on the head assembly 302 allows overlapping tracks to be written in either direction across the width of the tape and in either direction along the length of the tape. This improves the performance of the tape drive by reducing the need to reset the position of the head assembly when advancing tracks and by reducing the need to rewind the tape.

In various examples, the read heads may be staggered or offset from one another to allow for head-related circuitry or mechanical support. As shown in FIG. 3, the read heads may be staggered in an alternating pattern. In other examples, the read heads may be offset in a stepped pattern. These arrangements may be applied to other arrangements such as those illustrate in FIGS. 6, 15, and 16.

Figure 4:
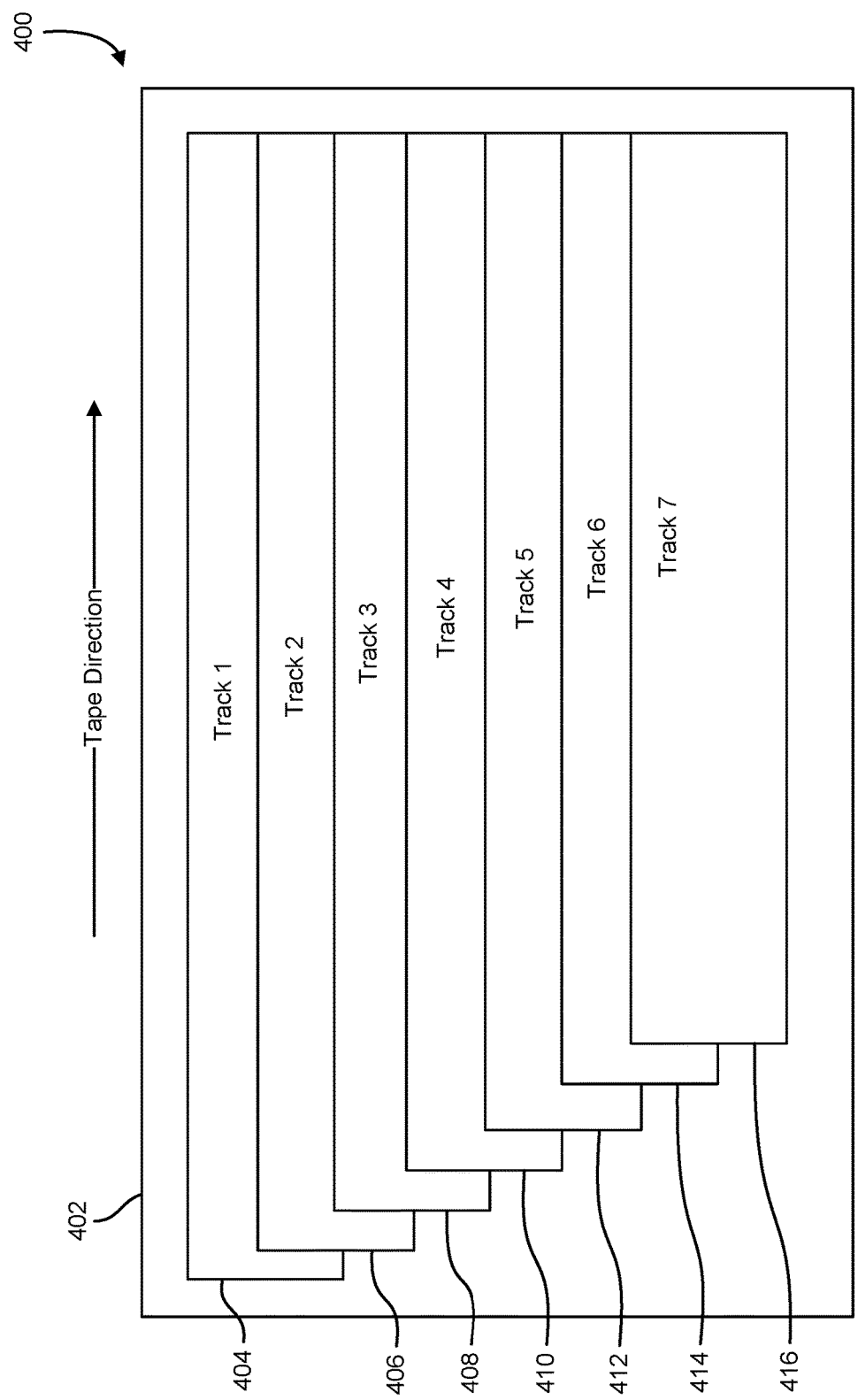
FIG. 4 shows an illustrative example of a magnetic tape with data tracks written in an overlapping pattern, in an embodiment.

FIG. 4 shows an illustrative example of a magnetic tape with data tracks written in an overlapping pattern, in an embodiment. A diagram 400 illustrates an example of a track pattern that can be created by a head assembly such as the head assemblies illustrated in FIG. 2 and FIG. 3. A piece of magnetic tape 402 includes a plurality of data tracks written in an overlapping pattern. The plurality of data tracks includes a first data track 404, a second data track 406, a third data track 408, a fourth data track 410, a fifth data track 412, a sixth data track 414, and a seventh data track 416. To create the overlapping track pattern, a tape drive using a head assembly containing at least one write head records the tracks to the piece of magnetic tape 402 in numerical order from top to bottom as illustrated. Successive tracks may be written from right to left, from left to right, or in alternating directions.

In various embodiments, as each track is written, a trailing set of read heads verifies the written data and also verifies that the previously written track was not disturbed by the current write. In one example, the first data track 404 is written, a trailing read head reads and verifies that the information was recorded correctly on the piece of magnetic tape 402. The tape drive advances the head assembly to position the write head over the second data track 406. As the second data track 406 is written to the piece of magnetic tape 402, a first trailing read head on the head assembly reads the data just written to the second data track 406 and verifies that the recorded data is correct. Concurrently, a second trailing read head reads the remaining portion of the first data track 404 and confirms that writing the data on the second data track 406 did not inadvertently overwrite too much of the first data track 404. The data recorded on the first data track can be verified in a number of ways. In some examples, verification information such as a checksum, data hash, or digital signature are written to the piece of magnetic tape on the track to be verified. The verification information includes information that identifies the track number. The previous track is verified by reading the data and regenerating the verification information from the retrieve data. If the regenerated verification information matches the verification information recorded on the previous track, and the track identifier matches the track being verified, the tape drive determines that the previous track is verified. If the track identifier does not match the track being verified, or if the verification information does not match the regenerated verification information, then the tape drive determines that the write operation has overwritten the previous track and an error is indicated.

In various examples, successive tracks can be written across the width of the piece of magnetic tape 402. The final track written by the tape drive is not overwritten by a subsequent track and therefore retains its full width. Therefore, as more tracks are written across the width of the piece of magnetic tape 402, the average track density produced by the tape drive increases.

Figure 5:
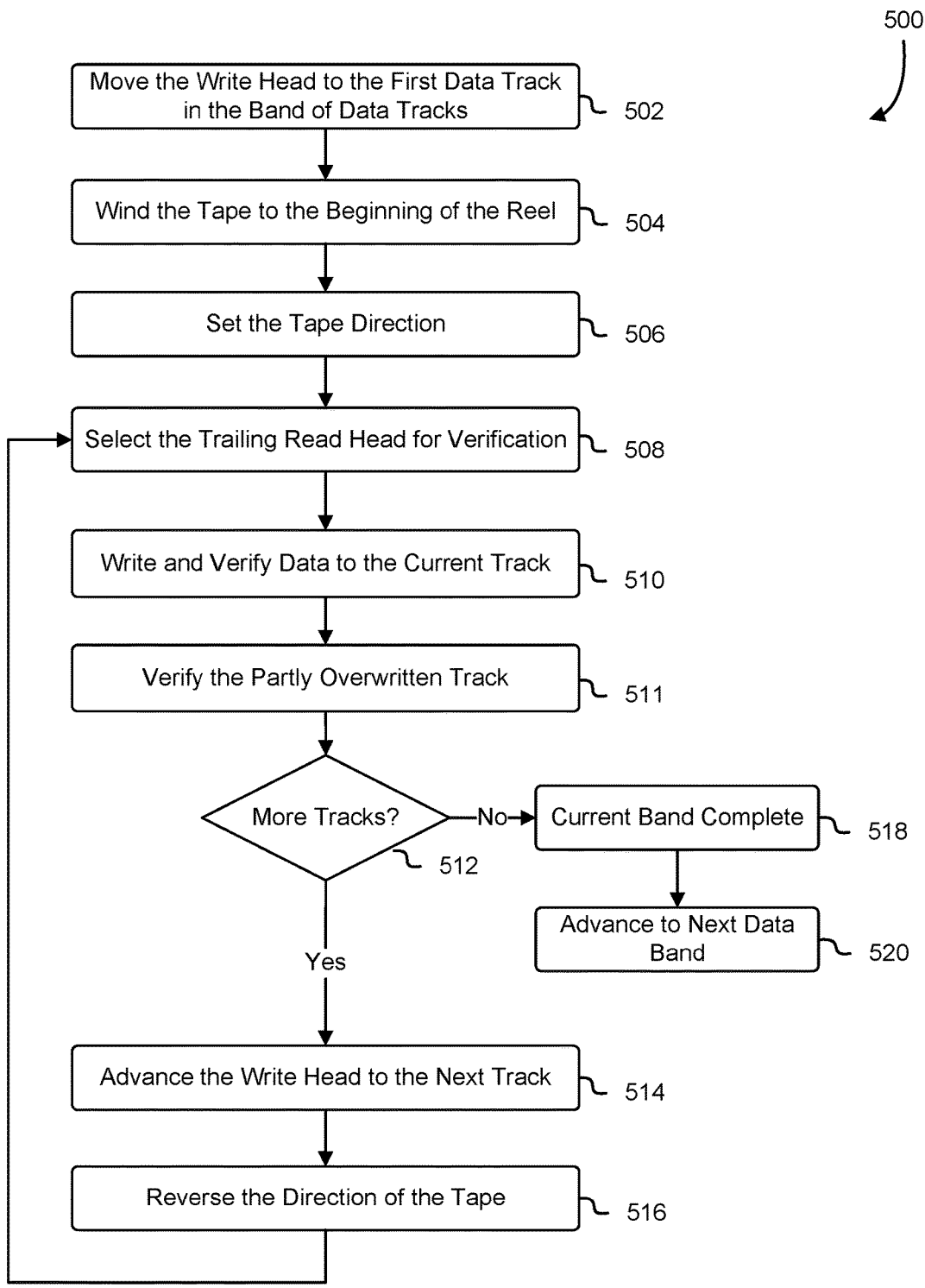
FIG. 5 shows an illustrative example of a process that, as a result of being performed by a tape drive controller, writes data to a set of tracks on a magnetic tape in a shingled pattern, in an embodiment.

FIG. 5 shows an illustrative example of a process that as a result of being performed by a tape drive, writes data to a set of tracks on a magnetic tape in a shingled pattern, in an embodiment. The process 500 begins at block 502 with the tape drive moving a head assembly so that a write head on the head assembly is in position to write a first data track of a band of data tracks. In an embodiment, a band of data tracks is a set of generally parallel data tracks positioned between a pair of servo tracks on a magnetic tape. In various implementations, the head assembly is positioned using a stepper motor that positions the head assembly relative to a stop or position-indicating sensor. In other implementations, the head assembly is positioned using an actuator, stepper motor, or servo in accordance with position encoding information derived from servo information written on the magnetic tape. At block 504, the tape drive rewinds the tape to the beginning of the reel. At block 506, the tape drive sets the tape direction based on the position of the tape on the source reel. After performing the operations at blocks 502, 504, and 506, the tape is positioned at the beginning of the first track of the track band.

In an example, at block 508, the tape drive identifies the read head that trails the write head to be used for verifying the written data. In some examples, the read head is selected to read the trailing edge of the written track, which is the portion of the written track that will remain if a subsequent track overwrites a portion of the current track being written. In some examples, at block 508, the tape drive identifies a second read head that reads a previous data track behind the trailing edge of the written track to ensure that the previous track is not rendered unreadable by writing the current track. At block 510, the tape retrieves the information to be written from a client computer system. In some implementations, information to be written is provided by the client computer system and retained in a buffer memory. As the tape moves over the head assembly, information is retrieved from the buffer memory and written to the tape. If the information verifies correctly, it is deleted from the buffer memory. At block 510, the tape drive concurrently writes information to the current write head, reads the just written information behind the current write head for verification, and reads information from any partially overwritten track to verify that any partially overwritten track is still readable. At block 511, the correctness of the operation is verified by verifying that the information just written matches the verification information read from the identified verification head, and that the information read from the previous track that was partially overwritten is intact. Verification that the previous track is intact may be accomplished by comparing the information to information retained in a buffer on the tape drive or by verifying a checksum for the information stored on the magnetic tape itself. In some embodiments, when shingled writes are employed, information is retained in a buffer memory until the subsequent track is written and verified in the subsequent write operation. Information is removed from the buffer when the secondary verification of the partially overwritten track is successful.

In various examples, verification of data can be accomplished in different ways. In some examples, verification of data is accomplished by reading the written data and determining that the data written matches the data supplied in the write command on a bit by bit basis. In other examples, verification of data may be accomplished by reading the written data and determining that the data is recoverable to the data that was written (using error correction). In yet other examples, verification of data may be accomplished by determining that the data actually written is sufficiently similar to the data supplied in the write command.

In an embodiment, at decision block 512, the tape drive checks to see if there are more tracks to be written in a band of tracks. If there are more tracks to be written, the process advances to block 514 and the tape drive advances the write head to the next track in the band of tracks. In some examples, at block 516, the direction of the tape is reversed and the subsequent track is written in the opposite direction. In other examples, at block 516, the tape is rewound and the subsequent track is written in the same direction.

At decision block 512, if there are no more tracks to be written, execution advances to block 518 and the current track band is complete. At block 520, the tape drive advances the head assembly to the next track band and the process 500 may continue.

Figure 6:
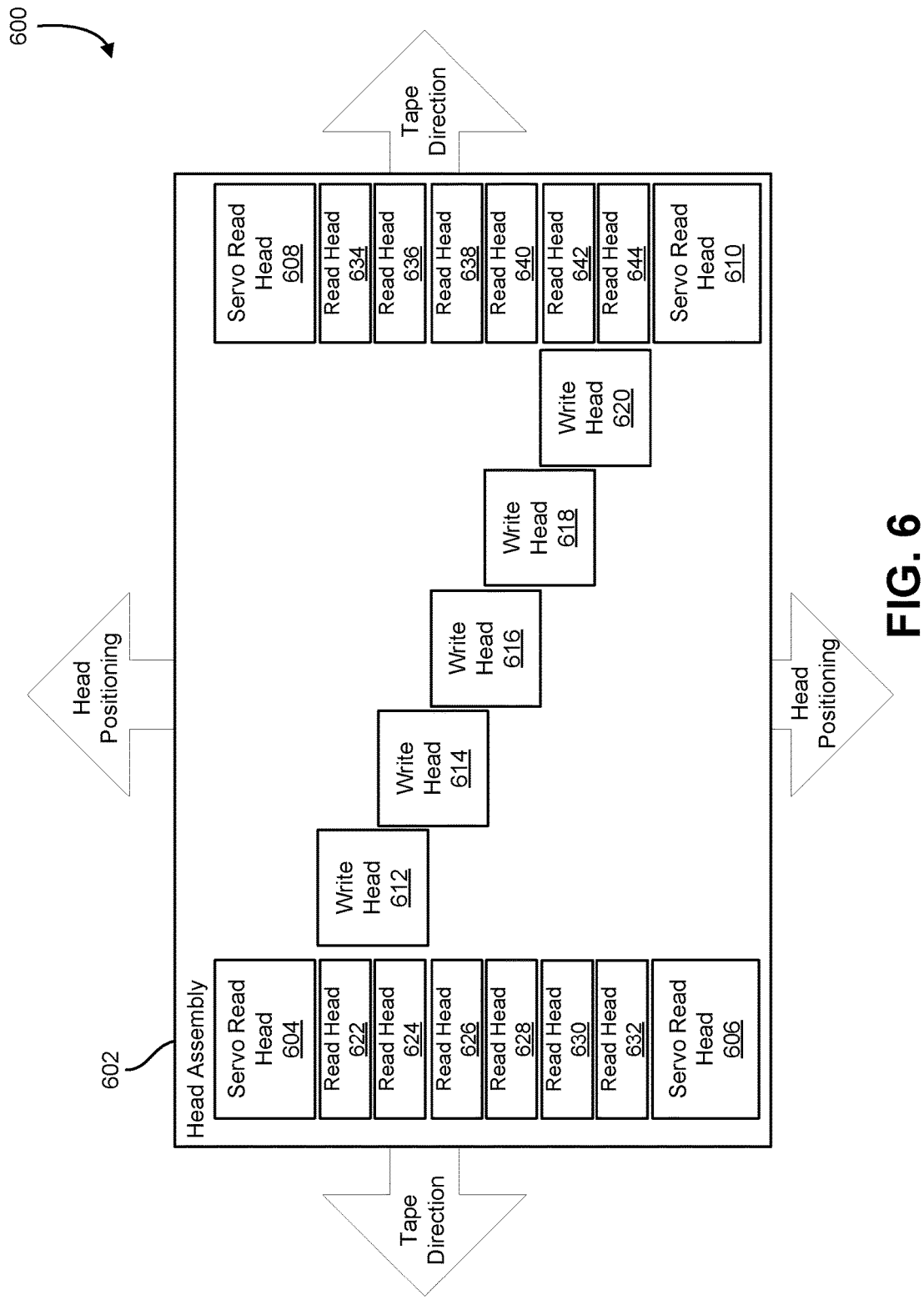
FIG. 6 shows an illustrative example of a magnetic tape drive having a head assembly that is capable of reading and writing, in a single pass, a plurality of data tracks in a shingled pattern, in an embodiment.

FIG. 6 shows an illustrative example of a magnetic tape drive having a head assembly that is capable of reading and writing, in a single pass, a plurality of data tracks in a shingled pattern, in an embodiment. A diagram 600 illustrates the arrangement of read and write heads on a head assembly 602 of the tape drive. The tape drive may, in various embodiments, move the head assembly across the width of a magnetic tape so that the head assembly 602 is positioned over a band of data tracks. The head assembly 602 includes a set of servo heads that provide position information used by the tape drive to accurately position the head assembly 602. The set of servo heads includes a first servo head 604, a second servo head 606, a third servo head 608, and a fourth servo head 610.

In various examples, the head assembly 602 allows the tape drive to write a plurality of data tracks in a shingled pattern such that the average track width is less than the width of each write head. For example, in the embodiment illustrated in FIG. 6, five write heads are shown; a first write head 612, a second write head 614, a third write head 616, a fourth write head 618, and a fifth write head 620. The tape drive is able to write data to each of the five write heads concurrently, producing an overlapping pattern where four data tracks are produced at approximately one-half the width of each write head and one track is produced at the full width of the trailing write head. The track arrangement produced depends in part on the direction the tape is moving when the write occurs. The differences between the track arrangements are illustrated in FIGS. 7 and 8.

The head assembly 602 includes two sets of read heads. A first set of read heads includes a first read head 622, a second read head 624, a third read head 626, a fourth read head 628, a fifth read head 630, and a sixth read head 632. A second set of read heads includes a seventh read head 634, an eighth read head 636, a ninth read head 638, a tenth read head 640, an eleventh read head 642, and a twelfth read head 644. The first set of read heads and the second set of read heads can be used as advance read heads that read data from tracks that are about to be overwritten and as data verification heads that read and verify data after the data has been written. For example, when the tape is being drawn across the head assembly 602 from left to right, the first set of read heads may be used as advance read heads and the second set of read heads can be used to verify the data written by the write heads. In some implementations, when the tape is being drawn from left to right, the twelfth read head 644 and the sixth read head 632 are generally not used. An example of the arrangement of data tracks produced when drawing the tape from left to right is illustrated in FIG. 7. In another example, when the tape is being drawn across the head assembly 602 from right to left, the second set of read heads is used as advance read heads and the first set of read heads is used to verify the data written by the write heads. In some implementations, when the tape is being drawn from right to left, the first read head 622 and the sixth read head 634 are generally not used. An example of the arrangement of data tracks produced when drawing the tape from right to left is illustrated in FIG. 8.

Figure 7:
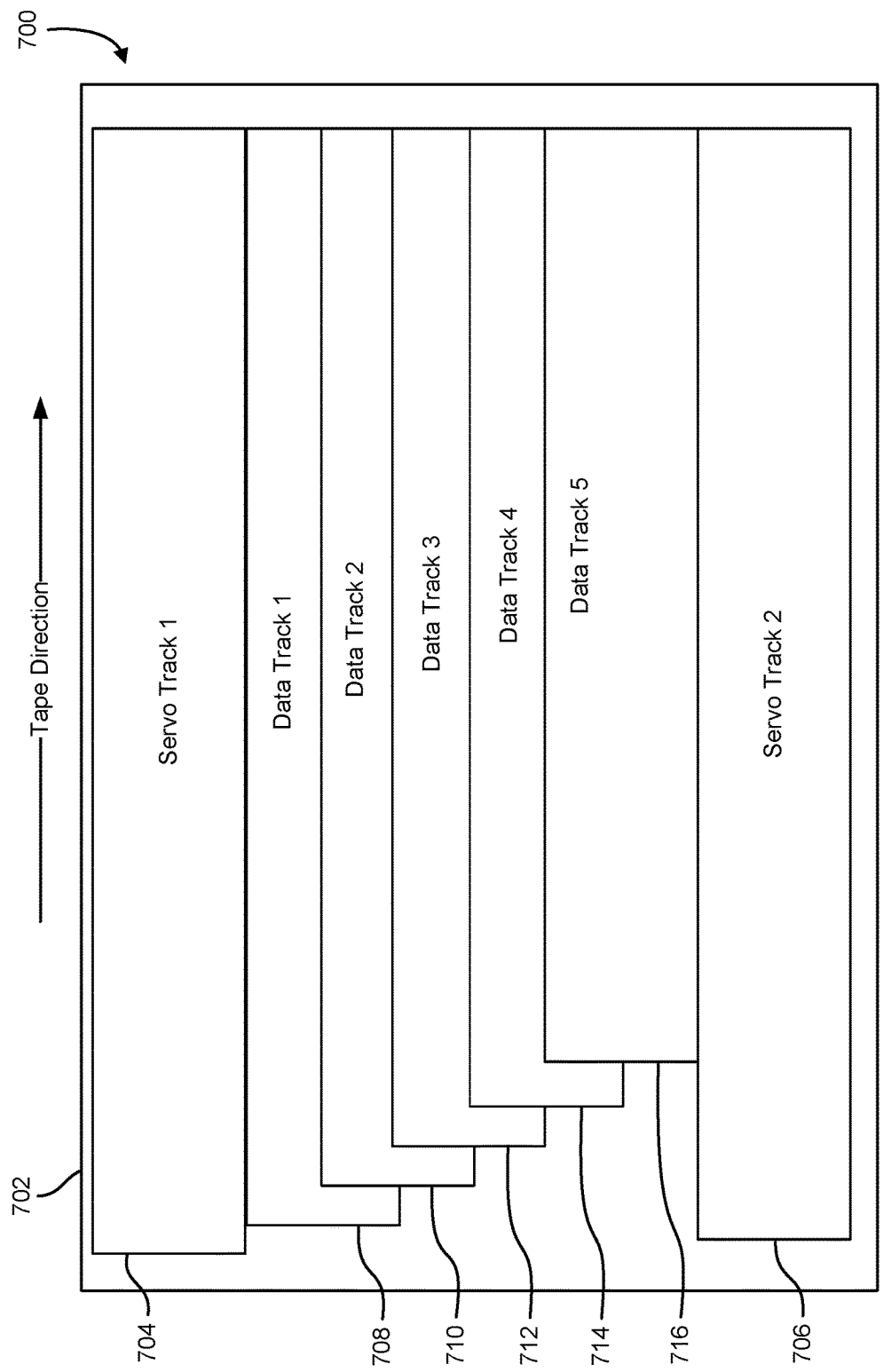
FIG. 7 shows an illustrative example of a magnetic tape where, using a head assembly similar to that shown in FIG. 5, a plurality of data tracks has been written in a single pass in a shingled pattern, in an embodiment.
Figure 8:
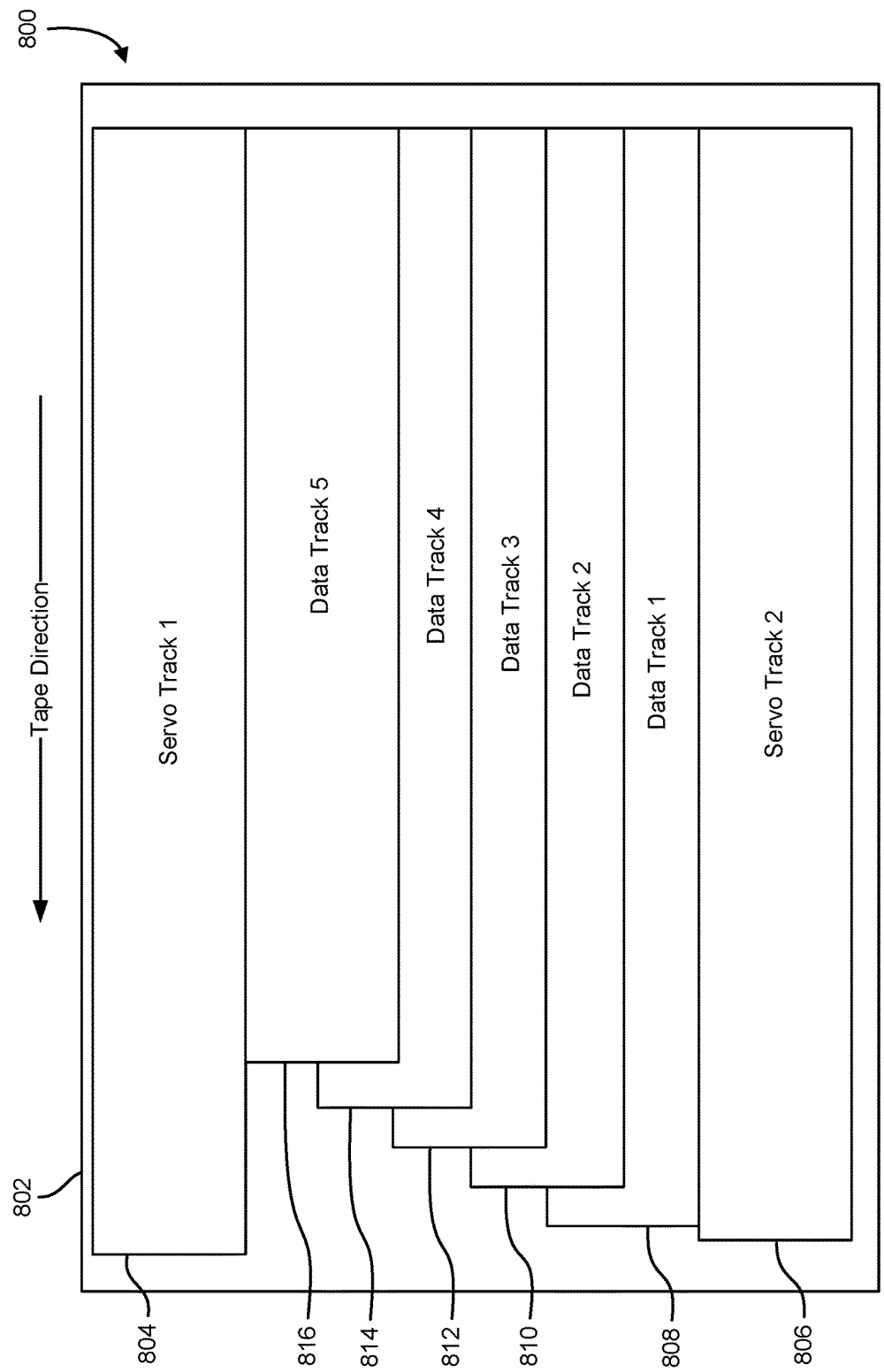
FIG. 8 shows an illustrative example of a magnetic tape where, using a head assembly similar to that shown in FIG. 5, a plurality of data tracks has been written in a single pass in a shingled pattern using a tape direction opposite that used in FIG. 7, in an embodiment.

FIG. 7 shows an illustrative example of a magnetic tape where, using a head assembly similar to that shown in FIG. 5, a plurality of data tracks has been written in a single pass in a shingled pattern, in an embodiment. A diagram 700 illustrates an embodiment of a track arrangement on a magnetic tape 702. The track arrangement includes a first servo track 704 and a second servo track 706. The servo tracks include information readable by a tape drive that allows the tape drive to determine the position of a head assembly in relation to the magnetic tape 702. In some implementations, each servo track includes positioning and coding information such as a grey code that allows the tape drive to determine the position of the head assembly along the length of the magnetic tape 702.

In some implementations, each servo track includes periodic bursts of analog signal information that allows the tape drive to determine the position of the head assembly across the width of the magnetic tape 702. In some examples, the analog signal information is a quadrature code that can be read by a read head. The quadrature code may be separated by a marker such as an automatic gain control ("AGC") field to enable detection of the quadrature code. The AGC field is a length of magnetic tape having a magnetic signal of a known amplitude. As the head assembly passes the AGC field, an amplifier assembly of the tape drive is calibrated based on the magnitude of the AGC field. After the AGC field, as the head assembly passes the servo information, each piece of analog servo information is determined relative to the measured magnitude of the AGC field. In some examples, the servo information contains four sinusoidal signals that are 90° out of phase with each other. Information from the four sinusoidal signals can be used to determine the location of the head assembly within a fraction of the width of the servo track. In some examples, the magnetic tape 702 includes only a single servo track. In other examples, the magnetic tape 702 includes a plurality of servo tracks that correspond to a number of servo heads on the head assembly.

In the example illustrated in FIG. 7, the magnetic tape 72 has five data tracks arranged between the two servo tracks. The five data tracks include a first data track 708, a second data track 710, a third data track 712, a fourth data track 714, and a fifth data track 716. The five data tracks may be written by any of a number of different head assemblies described in the present document. For example, the data tracks may be written in order from first to fifth using a head assembly that has a single write head, and where each successive track partially overlaps the previous track in another example, the data tracks may be written in a single pass using the head assembly illustrated in FIG. 6.

FIG. 8 shows an illustrative example of a magnetic tape where, using a head assembly similar to that shown in FIG. 5, a plurality of data tracks has been written in a single pass in a shingled pattern using a tape direction opposite that used in FIG. 7, in an embodiment. A diagram 800 illustrates an embodiment of a track arrangement on a magnetic tape 802. The track arrangement includes a first servo track 804 and a second servo track 806. The servo tracks include information readable by a tape drive that allows the tape drive to determine the position of a head assembly in relation to the magnetic tape 802. In some implementations, each servo track includes positioning and coding information such as a grey code that allows the tape drive to determine the position of the head assembly along the length of the magnetic tape 802.

In some implementations, each servo track includes periodic bursts of analog signal information that allows the tape drive to determine the position of the head assembly across the width of the magnetic tape 802. In some examples, the analog signal information is a quadrature code that can be read by a read head. The quadrature code may be separated by a marker such as an automatic gain control ("AGC") field to enable detection of the quadrature code. The AGC field is a length of magnetic tape having a magnetic signal of a known amplitude. As the head assembly passes the AGC field, an amplifier assembly of the tape drive is calibrated based on the magnitude of the AGC field. After the AGC field, as the head assembly passes the servo information, each piece of analog servo information is determined relative to the measured magnitude of the AGC field. In some examples, the servo information contains four sinusoidal signals that are 90° out of phase with each other. Information from the four sinusoidal signals can be used to determine the location of the head assembly within a fraction of the width of the servo track. In some examples, the magnetic tape 802 includes only a single servo track. In other examples, the magnetic tape 802 includes a plurality of servo tracks that correspond to a number of servo heads on the head assembly.

In the example illustrated in FIG. 8, the magnetic tape 82 has five data tracks arranged between the two servo tracks. The five data tracks include a first data track 808, a second data track 810, a third data track 812, a fourth data track 814, and a fifth data track 816. The five data tracks may be written by any of a number of different head assemblies described in the present document. For example, the data tracks may be written in order from first to fifth using a head assembly that has a single write head, and where each successive track partially overlaps the previous track in another example, the data tracks may be written in a single pass using the head assembly illustrated in FIG. 6.

In some embodiments, a disk drive contains a plurality of servo tracks with a plurality of data tracks sandwiched between each pair of servo tracks. For example, additional data tracks may be positioned below the second servo track 806 in FIG. 8. Each plurality of data tracks between each pair of servo tracks is called a track band. Each track band can be arranged similar to that shown in FIG. 7 or FIG. 8 based on the direction of the tape. For example, the magnetic tape 802 can be moved from right to left to produce the pattern illustrated in FIG. 8 for a first track band, then the direction of the tape can be reversed and the head assembly repositioned over another track band on the magnetic tape 802, resulting in the pattern illustrated in FIG. 7 for a second track band.

Figure 9:
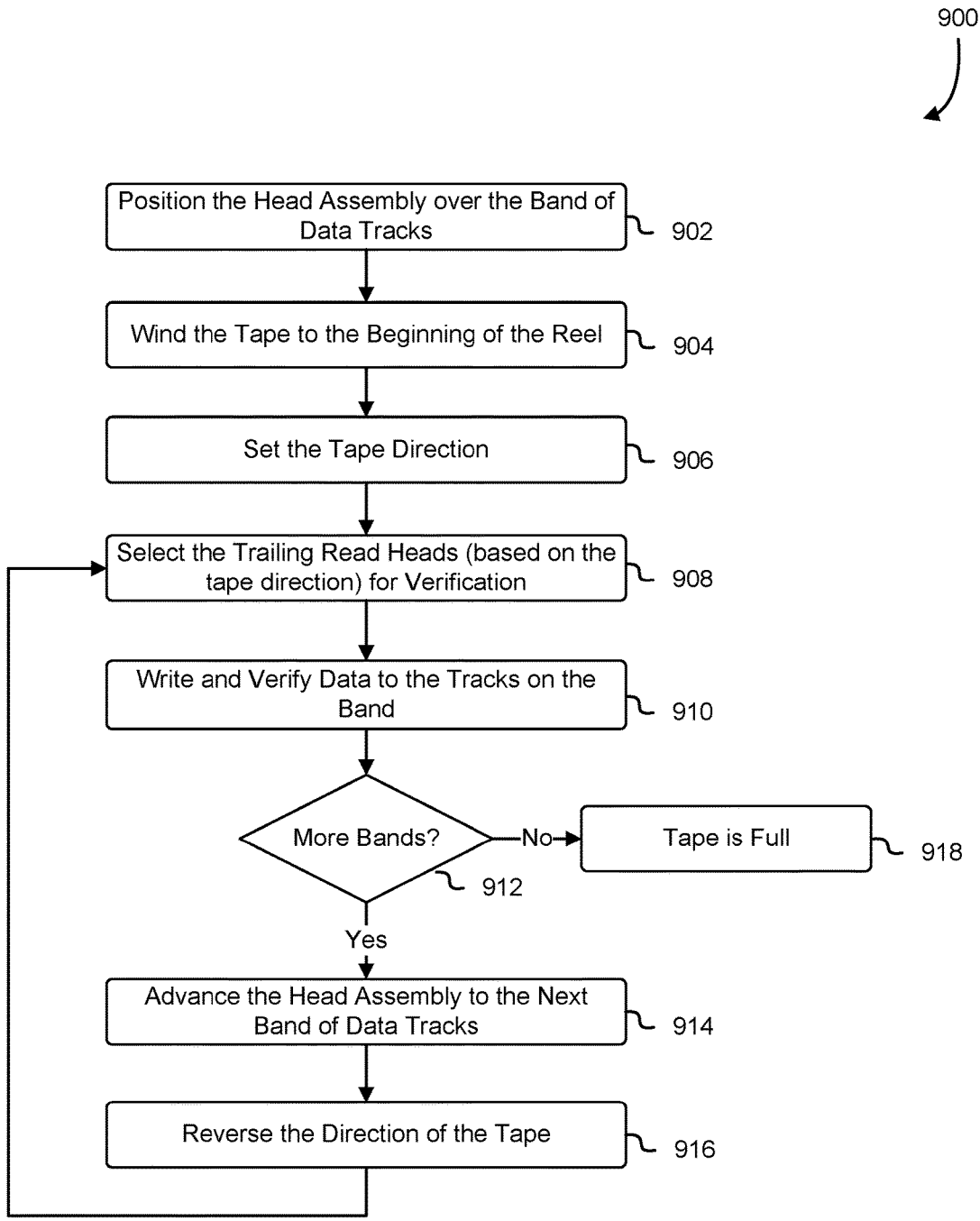
FIG. 9 shows an illustrative example of a process that, as a result of being performed by a tape drive controller, writes data to a band of tracks on a magnetic tape in a shingled pattern, in an embodiment.

FIG. 9 shows an illustrative example of a process that, as a result of being performed by a tape drive, writes data to a band of tracks on a magnetic tape in a shingled pattern, in an embodiment. A process 900 begins at block 902 with the tape drive positioning a head assembly over a band of data tracks on a magnetic tape. In some examples, the head assembly is positioned using servo information written on the magnetic tape. In other examples, the head assembly is positioned using a position encoder on the tape drive. In some examples, the tape drive includes a head assembly having a plurality of write heads such as the head assembly illustrated in FIG. 6. At block 904, the tape drive rewinds the tape to the beginning of the band of data tracks. At block 906, the tape drive sets the tape direction and speed to begin reading the band of data tracks.

In various examples, at block 908, the tape drive selects a set of read heads that trail the write heads on the head assembly to be used for verifying information written to the magnetic tape. At block 910, the tape drive writes data to the magnetic tape via the write heads of the head assembly, and during the same pass of the magnetic tape over the head assembly, the tape drive reads data from the set of read heads that follow the write heads. If the data read from the set of read heads matches the data written to the write heads of the head assembly, the tape drive determines that the data has been written correctly. If the data read from the set of read heads does not match the data written to the write heads of the head assembly, the tape drive determines that the data was not written correctly. If the data was not written correctly, in some examples the tape is rewound and the write is re-attempted. In other examples, if the data was not written correctly, an additional copy of the data is written to the tape. Data to be written is provided by a client computer system connected to the tape drive. Upon obtaining data from the client computer system, in various embodiments, the tape drive stores the data in a buffer memory on the tape drive. The tape drive reads the data from the buffer memory and writes it to the magnetic tape. As the writing of data is verified, data may be deleted from the buffer memory.

In some examples, at decision block 912, the tape drive determines whether there are additional bands to be written to the magnetic tape. At block 914, the tape drive advances the head assembly to the next band of data tracks. In some examples, the next band of data tracks may be between a different pair of servo tracks. In other examples, the next band of data tracks may be adjacent to a different servo track. In some implementations, additional bands are written in the same direction and the tape is rewound before writing each additional band. In other implementations, additional bands are written in the opposite direction and the tape direction is reversed before writing each additional band. At block 916, in some embodiments, the direction of the tape is reversed to read the next band of data tracks, and execution returns to block 908.

At decision block 912, if there are no additional bands to be written to the magnetic tape, execution advances to block 918. At block 918, the tape drive provides status information to the client computer system. The status information indicates whether the magnetic tape is full and whether the provided data was written to the tape successfully.

Figure 10:
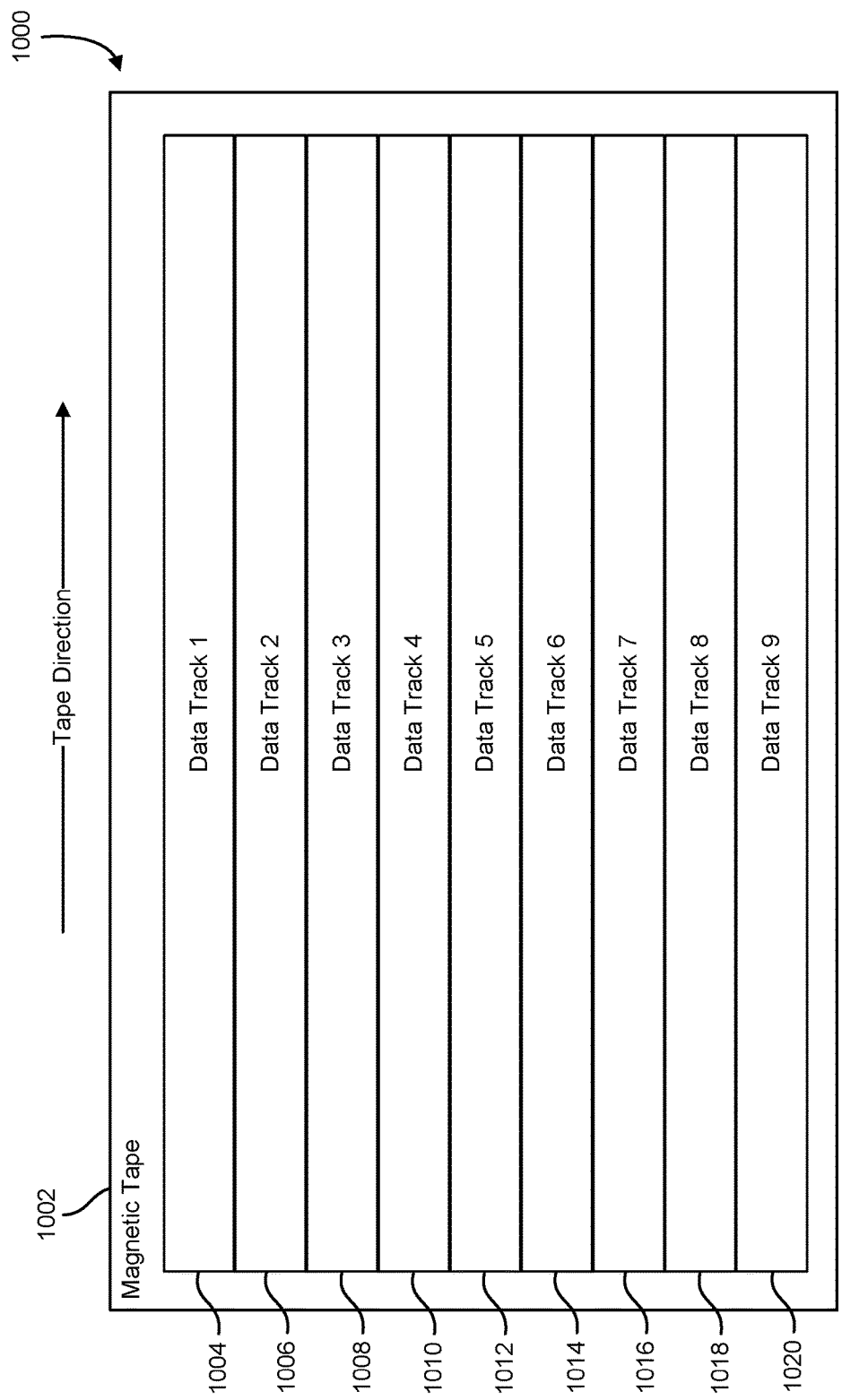
FIG. 10 shows an illustrative example of a magnetic tape with a plurality of data tracks, in an embodiment.

FIG. 10 shows an illustrative example of a magnetic tape with a plurality of data tracks, in an embodiment. A track arrangement diagram 1000 illustrates the arrangement of a plurality of data tracks on a magnetic tape 1002. The magnetic tape 1002 includes a plurality of substantially parallel data tracks. The plurality of data tracks includes a first data track 1004, a second data track 1006, a third data track 1008, a fourth data track 1010, a fifth data track 1012, a sixth data track 1014, a seventh data track 1016, an eighth data track 1018, and a ninth data track 1020. The magnetic tape 1002 may include other tracks such as servo tracks to assist in positioning a head assembly accurately over each data track. In some examples, servo tracks may be present between each data track to assist in the positioning of the head assembly. In the example illustrated in FIG. 10, the plurality of data tracks are written in the same direction. In other embodiments, the data tracks may be written in the opposite direction or in alternating directions on the magnetic tape.

In some embodiments, a client computer system wishes to reuse the magnetic tape 1002, but the magnetic tape 1002 contains information that must be retained. In some examples, the client computer system reads the information from the magnetic tape 1002 and stores information in a memory or storage device other than the tape drive. The client computer system writes new data to the magnetic tape 1002 which may include some or all of the information previously read from the magnetic tape 1002. Based on the arrangement of read and write heads on the head assembly, such an operation may require at least two passes of the head assembly over the magnetic tape 1002. For example, a first pass may be employed to read the data from the magnetic tape 1002, and a second pass may be employed to write new data to the magnetic tape 1002.

Figure 11:
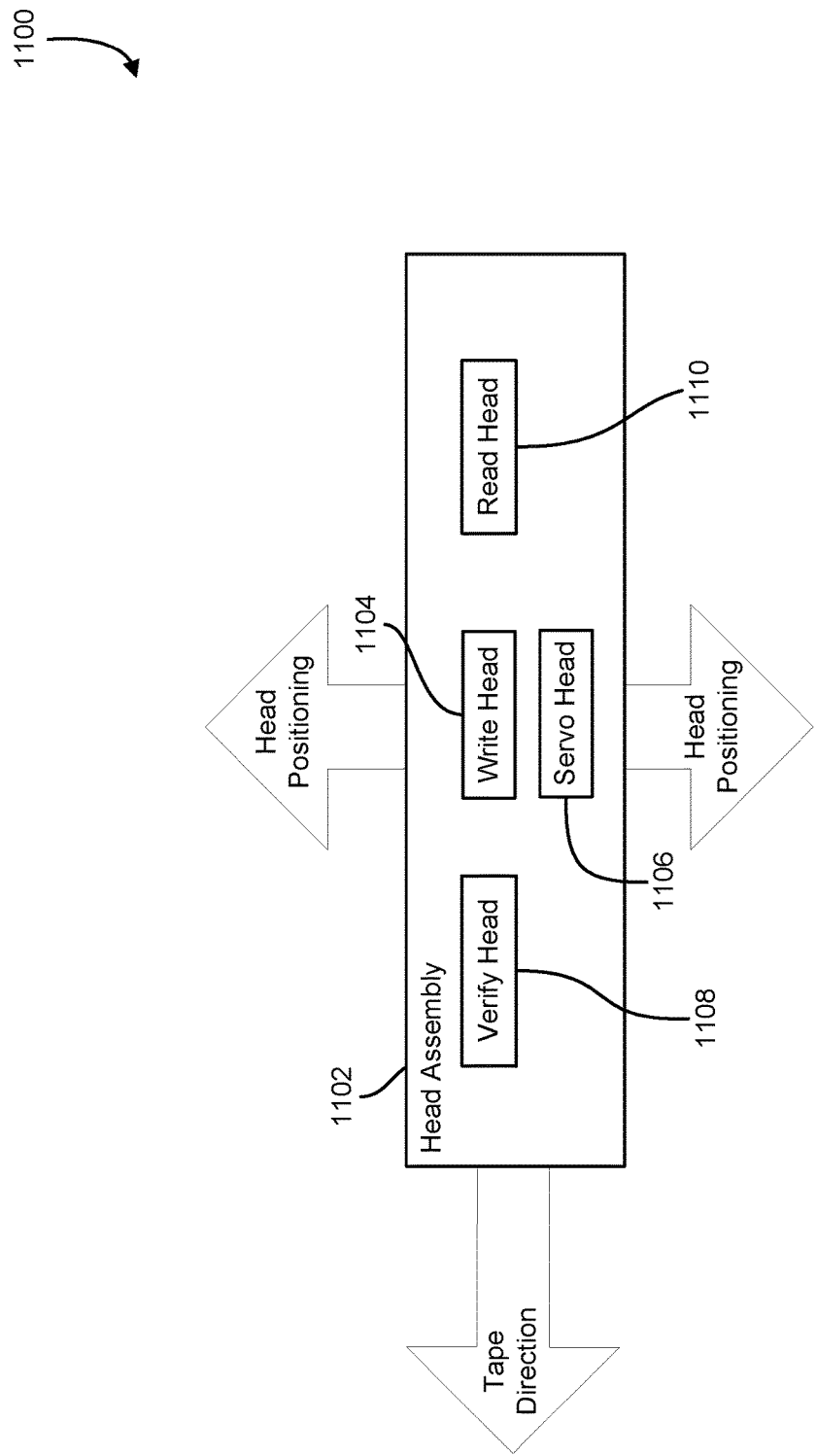
FIG. 11 shows an illustrative example of a head assembly that supports reading data that is about to be overwritten, in an embodiment.

FIG. 11 shows an illustrative example of a head assembly that supports reading data that is about to be overwritten, in an embodiment. A diagram 1100 illustrates the layout of a set of read and write heads on a head assembly 1102 of a tape drive. The head assembly 1102 includes a write head 1104 which allows the tape drive to write data to a magnetic tape. The servo head 1106 on the head assembly 1102 allows the tape drive to read position information encoded on the surface of the magnetic tape. Using the position information, the tape drive is able to position the head assembly 1102 accurately over the magnetic tape. The head assembly 1102 may be positioned using an armature, servo motor, stepper motor, or actuator that moves the head assembly 1102 across the width of the magnetic tape under the control of the tape drive. In some examples, a tape drive may include multiple head assemblies, and each head assembly can be positioned independently.

In some examples, the head assembly 1102 includes a verify head 1108 and a read head 1110. As the tape moves over the surface of the head assembly 1102 as indicated by the arrow in FIG. 11, the tape passes the read head 1110, then the write head 1104, and finally the verify head 1108. In various embodiments, the tape drive reads data that is about to be overwritten using the read head 1110, writes data provided by a client computer system using the write head 1104, and verifies the written information using the verify head 1108, in a single pass of the magnetic tape over the head assembly 1102.

In one implementation, a client computer system submits a command to write data to a tape drive. The tape drive writes the data to be written in a temporary memory buffer on the tape drive. In response to the command, the tape drive positions the head assembly 1102 for writing, and concurrently reads data with a read head 1110, writes data with the write head 1104, and verifies the written data with the verify head 1108. The data returned from the read head 1110 is the data that is about to be overwritten. As the tape passes the write head 1104, the data read with the read head 1110 is overwritten with data retrieved from the temporary memory buffer. Data is retrieved and stored from both the read head 1110 and the verify head 1108. If the data read from the verify head 1108 matches the data written to the write head 1104, the data storage command is successful and the data to be written is removed from the temporary memory buffer. Data that is retrieved from the read head 1110 is returned to the client computer system along with status information indicating whether the write command was successful. In this way, the tape drive is able to write data to the magnetic tape while also preserving data overwritten as a consequence of the write operation.

Such operations may be used to improve the operation of the tape drive, improve the utilization of previously used magnetic tapes, and improve as a whole a computer system of which the tape drive is a part. For example, a client computer system can reuse the magnetic tape containing data by storing additional information on the magnetic tape while preserving any information overwritten. Data that is overwritten is returned to the client computer system, and it can either be written to another location on the magnetic tape or stored on another storage device. In another example, by reading the track before it is overwritten, the tape drive confirms the tape is empty as it is being overwritten. If no valid data is found to be overwritten, the write operation is successful. If validated is found to be overwritten, the write operation is stopped, and any overwritten data is returned to the client computer system.

Figure 12:
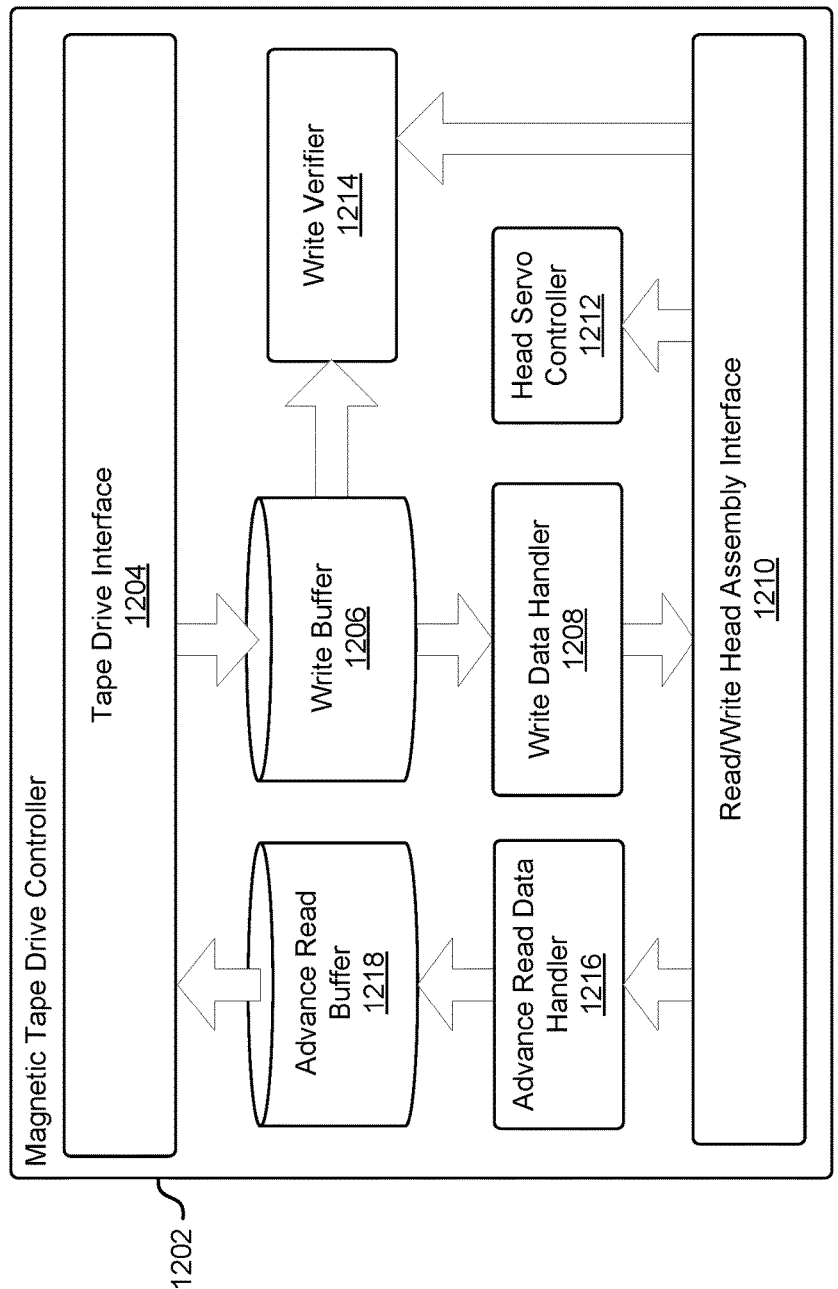
FIG. 12 shows an illustrative example of a magnetic tape drive controller that enables concurrent data read, write, and verification operations, in an embodiment.

FIG. 12 shows an illustrative example of a magnetic tape drive controller that enables concurrent data read, write, and verification operations, in an embodiment. A structure diagram 1200 illustrates a magnetic tape drive controller 1202 that is part of a tape drive. The magnetic tape drive controller 1202 is a computer system comprising a control board, a processor, and memory storing executable instructions that as a result of being executed by the processor cause the magnetic tape drive controller 1202 to control the motors, servo motors, read and write heads, and other electrical components of the tape drive. The magnetic tape drive controller 1202 includes a tape drive interface 1204 that provides a physical interface that allows client computer systems to interface with the tape drive. The tape drive interface 1204 can be a serial, parallel, wireless, or fiber-optic interface that allows commands to be submitted from a client computer system in accordance with a command structure supported by a command interpreter component of the drive software. The magnetic tape drive controller 1202 includes a number of software components made up with executable instructions that are stored on a memory of the magnetic tape drive controller 1202. The instructions of a software component, when executed, cause the magnetic tape drive controller 1202 to manipulate physical components of the tape drive in a way that performs a command or part of a command issued by the client computer system. The magnetic tape drive controller 1202 includes one or more elements that include software components. For example, software components may be included as part of the tape drive interface 1204, a write data handler 1208, a read/write head assembly interface 1210, a head servo controller 1212, a write verifier 1214, and an advancer read data handler 1216.

In some examples, the tape drive interface 1204 is a small computer system interface ("SCSI") interface, intelligent drive electronics ("IDE") interface, or a serial advanced technology attachment ("SATA") interface. The command set supported by the tape drive interface 1204 may be based at least in part on the physical interface standard supported by the tape drive. In general, commands may be included that read data from the disk drive, write information to the disk drive, format the disk drive, and perform other administrative operations related to media management.

For example, when a write command is received by the magnetic tape drive controller 1202, the magnetic tape drive controller 1202 acquires the data to be written from a client computer system by the tape drive interface 1204. The tape drive controller stores the data in a write buffer 1206. In various examples, the write buffer 1206 is a portion of solid state random access memory allocated for the temporary storage of data before the data is written to the magnetic tape. The magnetic tape drive controller 1202 includes a write data handler 1208. The write data handler 1208 is a process running on the magnetic tape drive controller 1202 that retrieves the data from the write buffer 1206 and writes data to a magnetic tape using a read/write head assembly interface 1210. In preparation for writing the data, the write data handler 1208 positions the head assembly over the magnetic tape and winds the tape to a proper position for writing. The write data handler 1208 advances the tape while writing the data to a write head on the head assembly via the read/write head assembly interface 1210. The read/write head assembly interface 1210 includes a physical interface and amplifiers that drive current to one or more write heads on the head assembly and receive signals received from one or more read heads on the head assembly.

In some examples, as data is written to the magnetic tape by the write data handler 1208, servo information is returned to the head servo controller 1212. The head servo controller 1212 uses the servo information to determine the position of the head assembly over the magnetic tape, and adjusts the position of the head assembly so that the head is positioned over the track to be written on the magnetic tape.

In addition, in some examples, as data is written to the magnetic tape by the write data handler 1208, data that is about to be overwritten is read by an advance read head and provided to the advance read data handler 1216. The advance read data handler determines whether the red data is valid, and if there is valid data stored on the track to be overwritten, stores the retrieve data in an advance read buffer 1218.

In addition, in some examples, as data is written to the magnetic tape by the write data handler 1208, a read head that trails the write head reads the data just written and provides the data to a write verifier 1214. The write verifier 1214 confirms that the data read matches the data written in the write buffer 1206. If the data provided to the write verifier 1214 matches the data in the write buffer 1206, the data in the write buffer 1206 can be deleted.

In various implementations, after the write operation is complete, the tape drive interface 1204 reads the data overwritten from the advance read buffer 1218 and returns the overwritten data to the client computer system. If the write operation is not entirely verified, unwritten information may also be returned from the write buffer 1206. In some examples, the tape drive interface makes an additional attempt to write information that was not verified from the write buffer 1206 to the magnetic tape.

The operations performed by the advance read data handler 1216, the write data handler 1208, and the write verifier 1214 occur concurrently. In the present document, operations described as being performed concurrently may be performed using a single processor allocated in a time sliced fashion, resulting in the operations occurring in an interleaved fashion. In other embodiments, concurrent operations may be accomplished by using separate processors or processor cores allocated to each concurrent process. The term concurrent describes operations that are performed in a time-sliced manner in a single processor or that are only partially concurrently performed using multiple processors.

Figure 13:
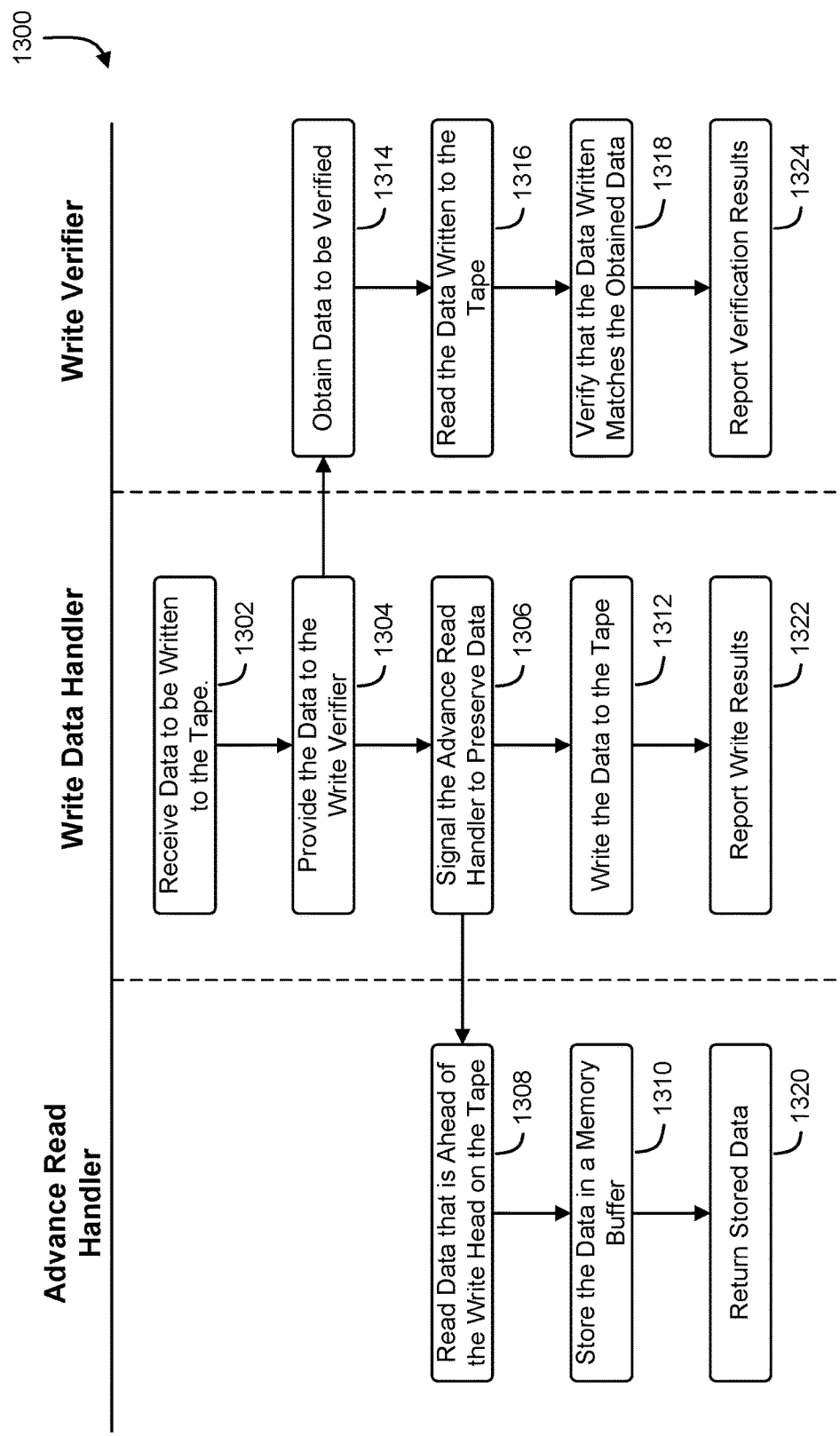
FIG. 13 shows an illustrative example of a process that, as a result of being performed by an advancer read handler, a write handler, and a write verifier, concurrently reads, writes, and verifies data on a magnetic tape, in an embodiment.

FIG. 13 shows an illustrative example of a process that, as a result of being performed by an advance read handler, a write handler, and a write verifier of a tape drive, concurrently reads, writes, and verifies data on a magnetic tape, in an embodiment. A process diagram 1300 illustrates the process that begins at block 1302 with the write data handler receiving command to write data to a magnetic tape. The write data handler receives the data to be written to the magnetic tape from a client computer system. The client computer system can be a personal computer, handheld computer, an embedded computer system, computing appliance, or storage client having an interface compatible with the tape drive. At block 1304, the write data handler provides the data to the write verifier. In some embodiments, the data is provided by writing the data to a buffer memory accessible to the write verifier.

In an embodiment, at block 1306, the write data handler signals the advance read handler to preserve data that is about to be overwritten. At block 1308, the advance read handler identifies a read head on the head assembly that is in advance of the write head and begins reading data. At block 1310, as data is received by the advance read handler, the data is stored in a memory buffer to be provided to the client. In some examples, if the data read by the advance read handler is invalid (data is not recoverable or not present), the data is discarded.

In an embodiment, at block 1312, the write data handler writes the data provided by the client computer system to the magnetic tape using a write head on the head assembly. The writing of the data by the write data handler occurs concurrently with the reading of the data by the advance read handler.

In an embodiment, at block 1314, the write verifier obtains the data to be verified from the right data handler. At block 1316, the write verifier identifies a read head that trails the write head being used to write the data by the write data handler and begins reading data. At block 1818, the write verifier verifies that the data read matches the data provided by the write data handler. If the data matches, the write verifier determines that the data was correctly written. If the data does not match, the write verifier determines that the data was incorrectly written by the write data handler. The verification operation performed by the write verifier occurs concurrently with the reading of the data by the advance read handler and the writing of the data by the write data handler.

When the write operation is complete, the three concurrent operations return the status to the tape drive and to the client computer system. At block 1320, the advance read handler returns to the client computer system the data that was overwritten. At block 1322, the write data handler returns the status of the write operation. At block 1324, the write verifier returns the verification status of the write operation to the client computer system. In some implementations, the status information is returned as part of a command status returned through an IDE, SCSI, or SATA interface.

Figure 14:
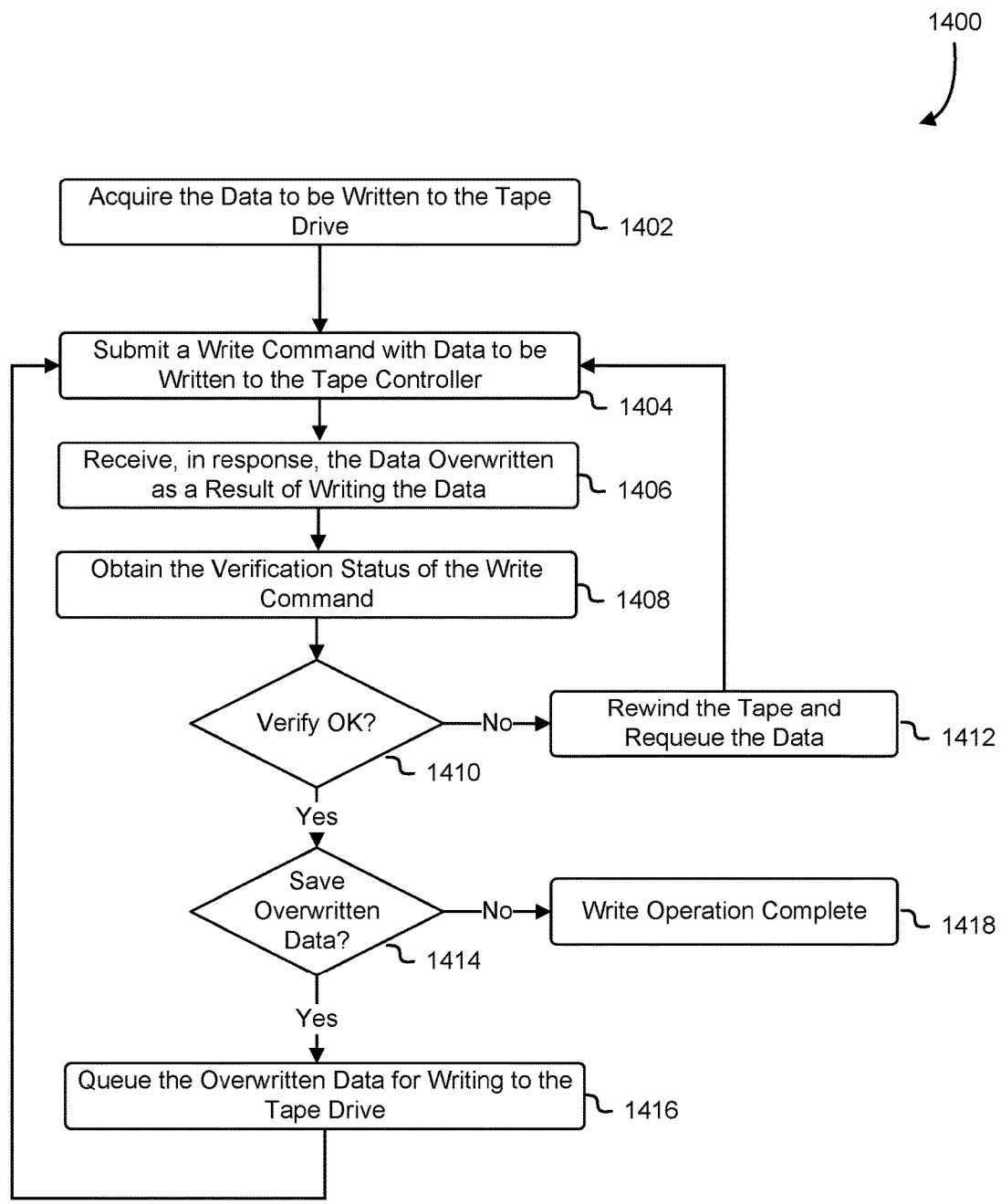
FIG. 14 shows an illustrative example of a process that, as a result of being performed by a client computer system, causes a tape drive to perform concurrent read, write, and verification operations, in an embodiment.

FIG. 14 shows an illustrative example of a process that as a result of being performed by a client computer system causes a tape drive to perform concurrent read, write, and verification operations, in an embodiment. A process 1400 begins at block 1402 with a client computer acquiring data to be written to a magnetic tape. The client computer can be a personal computer system, laptop computer system, cell phone, tablet computer system, or data storage client. Data can be acquired from one or more application programs, from a user, or retrieved from another storage device.

At block 1404, the client computer system submits a write command together with data to be written to a tape controller on the tape drive. In various examples, the commands are submitted to the tape controller via a SCSI, ATA, SATA, FC, or LTO interface. At block 1406, the client computer system receives, in response to the write command, a block of data that was overwritten as a result of the previous read operation submitted at block 1404. At block 1408, the client computer system receives a verification status for the write command issued at block 1404. At decision block 1410, the client computer system evaluates the verification status. If the verification status indicates that the tape drive was able to read the written data, and that the data read matched the information that was provided with the write command by the client, execution advances to decision block 1414. If the verification status indicates a failure of the write command, execution advances to block 1412. At block 1412, in some examples, the client rewinds the tape drive to reposition the tape over the section of magnetic tape that was written in error. In other examples, the client attempts to rewrite an additional copy of the data to the magnetic tape at the present location on the magnetic tape. After repositioning the tape, execution returns to block 1404 and the client computer system makes another attempt to read the data to the magnetic tape by resubmitting the write command. The write command submitted includes both the original data to be written to the tape, and any additional data that was overwritten by the previous write command.

If verification of the data written to the magnetic tape is successful, execution advances from decision block 1410 to decision block 1414. At decision block 1414, the client computer system examines the overwritten data saved by the tape drive and determines whether the overwritten data should be saved. In some examples, if the overwritten data is invalid, corrupt, or if the overwritten data is otherwise determined to be discarded below, execution advances to block 1418, and the client computer system determines that the write operation is complete. If the client computer system determines that the overwritten data is to be saved, execution advances to block 1416 and the data saved at block 1406 is requeued for writing to the tape drive. The requeued data is written to the tape by returning to block 1404 and submitting the requeued data in a new write command. The process of overwriting requeued overwritten data, and requeuing may continue a number of times until the client computer system determines that there is no data overwritten or that the overwritten data may be discarded.

Figure 15:
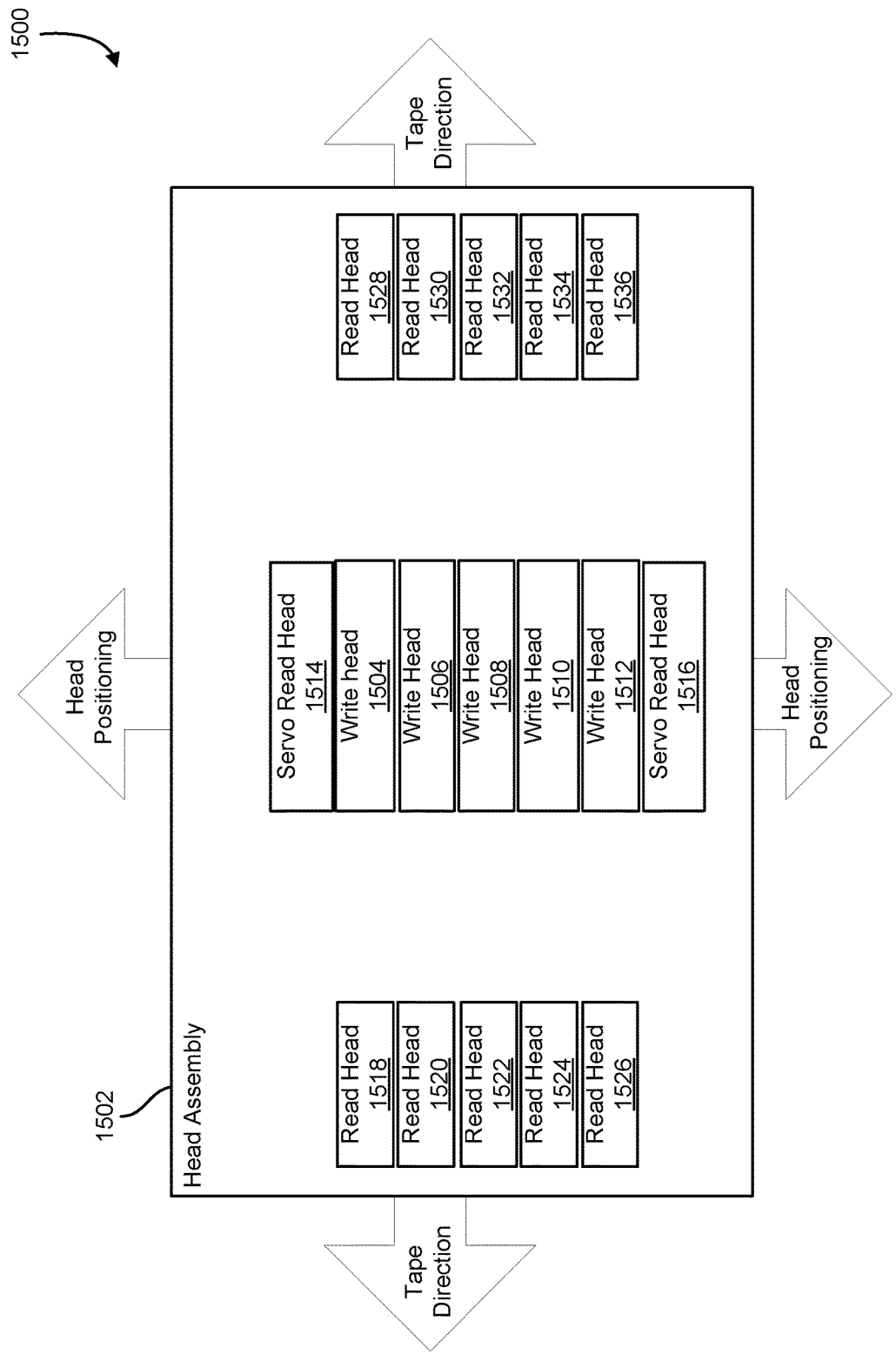
FIG. 15 shows an illustrative example of a head assembly that enables concurrent data read, write, and verification operations of a multi-track magnetic tape, in an embodiment.

FIG. 15 shows an illustrative example of a head assembly that enables concurrent data read, write, and verification operations of a multi-track magnetic tape, in an embodiment. A diagram 1500 illustrates the layout of the set of read and write heads on the head assembly 1502. The head assembly 1502 includes a set of five write heads that include a first write head 1504, a second write head 1506, a third write head 1508, a fourth write head 1510, and a fifth write head 1512. The write heads are distributed across the width of the head assembly 1502. As a magnetic tape is drawn across the head assembly, the tape drive positions the head assembly 1502 across a band of tracks such that the set of write heads is centered over five corresponding data tracks on the magnetic tape.

In some examples, the tape drive positions the head assembly 1502 using an active servo system that relies on position information derived by one or more servo heads. In the implementation illustrated in FIG. 15, the head assembly 1502 includes a first servo read head 1514 and a second servo read head 1516. The servo heads read position information encoded on the magnetic tape that tells the tape drive the location of the head assembly 1502 in relation to the surface of the magnetic tape. The position of the head assembly 1502 relative to the magnetic tape may be modified using a set of controllable rollers connected to the magnetic tape, or a servo motor or actuators coupled to the head assembly 1502.

In various examples, the head assembly 1502 includes two sets of read heads. The first set of read heads includes a first read head 1518, a second read head 1520, a third read head 1522, a fourth read head 1524, and a fifth read head 1526 positioned in line with the write heads. The second set of read heads includes a sixth read head 1528, a seventh read head 1530, an eighth read head 1532, a ninth read head 1534, and a tenth read head 1536 positioned in line with the write heads. The first set of read heads and the second set of read heads are positioned on opposite sides of the set of write heads. Depending on the direction of the magnetic tape over the head assembly 1502, one of the sets of read heads can be used to verify the data written with the write heads, and the other of the sets of read heads can be used to read and preserve data that is about to be overwritten by the write heads. If the direction of the tape over the head assembly 1502 is reversed, the functions performed by each set of read heads are reversed.

In various embodiments, the tape drive may write data to one or more write heads simultaneously to increase data throughput of the tape drive. In addition, read and write operations may occur on different tracks during the same pass of the magnetic tape over the head assembly 1502. For example, data may be read on the third track using the third read head 1522 while data is being written to the first and the second data tracks using the first write head 1504 and the second write head 1506. In some examples, data may be transferred from a first track to a second track while overwriting data on the first track with data provided from a client computer system.

Figure 16:
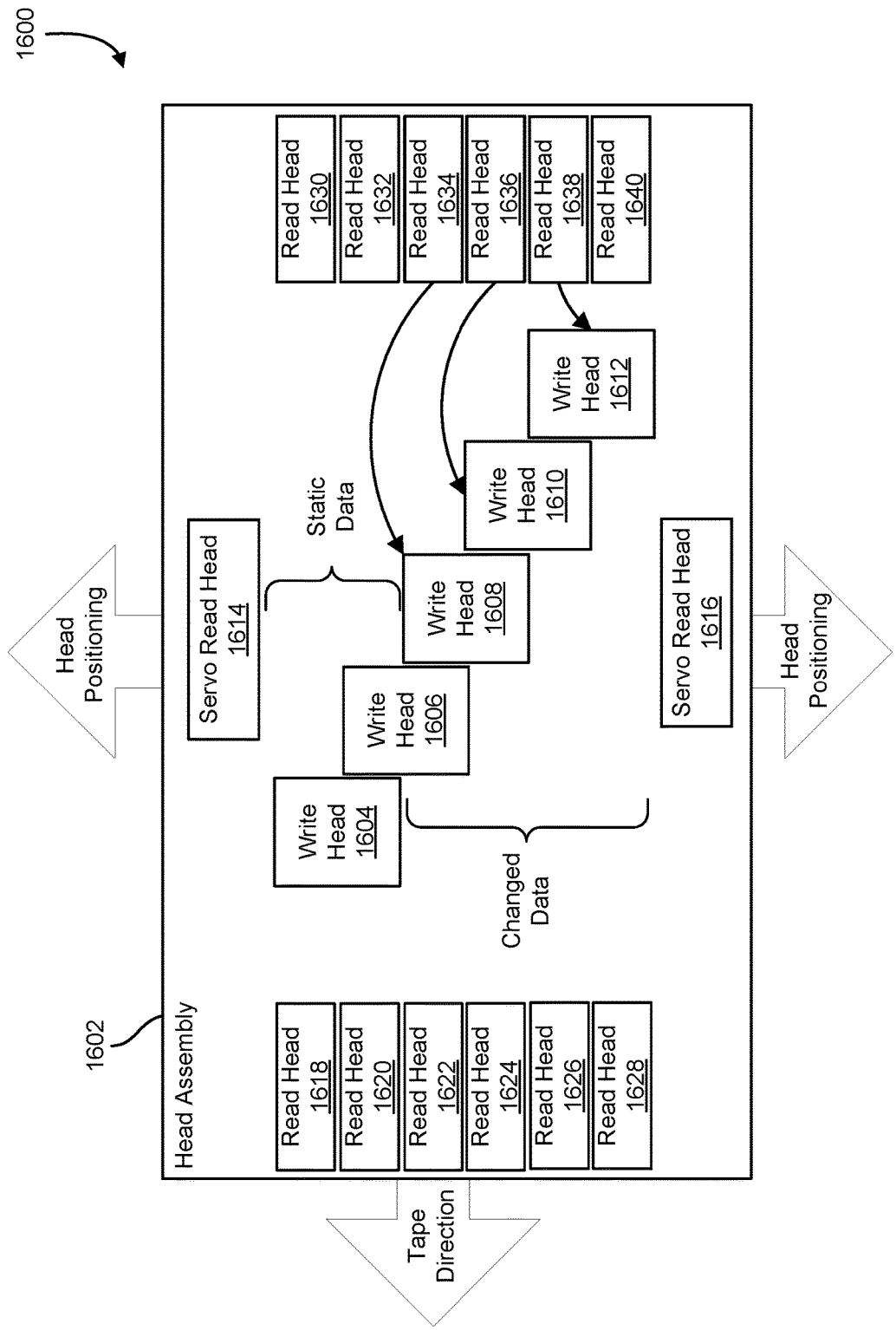
FIG. 16 shows an illustrative example of a head assembly that enables concurrent data read, write, and verification operations of a multi-track magnetic tape, with writes performed in a shingled pattern, in an embodiment.

FIG. 16 shows an illustrative example of a head assembly that enables concurrent data read, write, and verification operations of a multi-track magnetic tape, with writes performed in a shingled pattern, in an embodiment. A diagram 1600 illustrates an arrangement of read and write heads on a head assembly 1602. The head assembly 1602 includes a set of five write heads: a first write head 1604, a second write head 1606, a third write head 1608, a fourth write head 1610, and a fifth write head 1612. The write heads are spread across the width of the head assembly 1602 and staggered along the length of the head assembly 1602. As the magnetic tape is drawn across the surface of the head assembly 1602, the arrangement of the write heads allows the head assembly 1602 to generate an overlapped or shingled pattern of tracks on the magnetic tape.

In various embodiments, a tape drive positions the head assembly 1602 over a set of data tracks using a servo mechanism. The servo mechanism relies on position data read using a pair of servo heads on the head assembly 1602. The servo heads include a first servo read head 1614 and a second servo read head 1616. In some implementations, the two servo read heads allow the head assembly 1602 to be positioned on either side of the servo track on the magnetic tape. This reduces the number of servo bands required to position the head assembly, increasing the total storage capacity of the magnetic tape.

In various examples, the head assembly 1602 includes two sets of read heads. The first set of read heads includes a first read head 1618, a second read head 1620, a third read head 1622, a fourth read head 1624, a fifth read head 1626, and a sixth read head 1628 positioned in-line with the write heads. The second set of read heads includes, a seventh read head 1630, an eighth read head 1632, a ninth read head 1634, a tenth read head 1636, an eleventh read head 1638, and a twelfth read head 1640 positioned in line with the write heads. The first set of read heads and the second set of read heads are positioned on opposite sides of the set of write heads. Depending on the direction of the magnetic tape over the head assembly 1602, one of the sets of read heads can be used to verify the data written with the write heads, and the other of the sets of read heads can be used to read and preserve data that is about to be overwritten by the write heads. If the direction of the tape over the head assembly 1602 is reversed, the functions performed by each set of read heads are reversed.

As the direction of the tape over the head assembly 1602 is reversed, the particular read heads used shift to cover the portion of the data tracks that remain after the passage of the write heads. For example, if the tape direction moves from right to left over the head assembly 1602, the second through the sixth read heads and the eighth through the twelfth read heads are used. If the tape direction moves from left to right, the first through the fifth read heads and the sixth through the ninth read heads are used.

Using the arrangement of read and write heads illustrated in FIG. 16, it is possible for a tape drive to write a subset of data tracks that are laid down in a shingled pattern by the write heads. For example, FIG. 16 illustrates how tracks three through five can be written while leaving tracks one and two intact. Before the magnetic tape passes the write heads, it passes the second set of read heads, where the ninth read head 1634, tenth read head 1636, and eleventh read head 1638 read the data that is about to be overwritten. The tape drive writes data to the third write head 1608, the fourth write head 1610, and the fifth write head 1612. The data written may be data supplied by a client computer system or data read by the second set of read heads. For example, the head assembly 1602 allows the tape drive to modify data on the third data track while leaving data from the fourth and fifth data tracks intact by writing the new data to the third write head 1608, while writing data read from the tenth read head 1636 to the fourth write head 1610 and writing data read from the eleventh read head 1638 to the fifth write head 1612. This allows greater flexibility in how data is laid out on the tracks of the magnetic tape, even when tracks are arranged in an overlapping pattern to increase track density.

In some examples, multiple advance read heads may be used to preserve the data overwritten by a single write head. For example, if a write head overwrites a plurality of data tracks, a corresponding plurality of data tracks may be used to preserve the data before it is overwritten.

Figure 17:
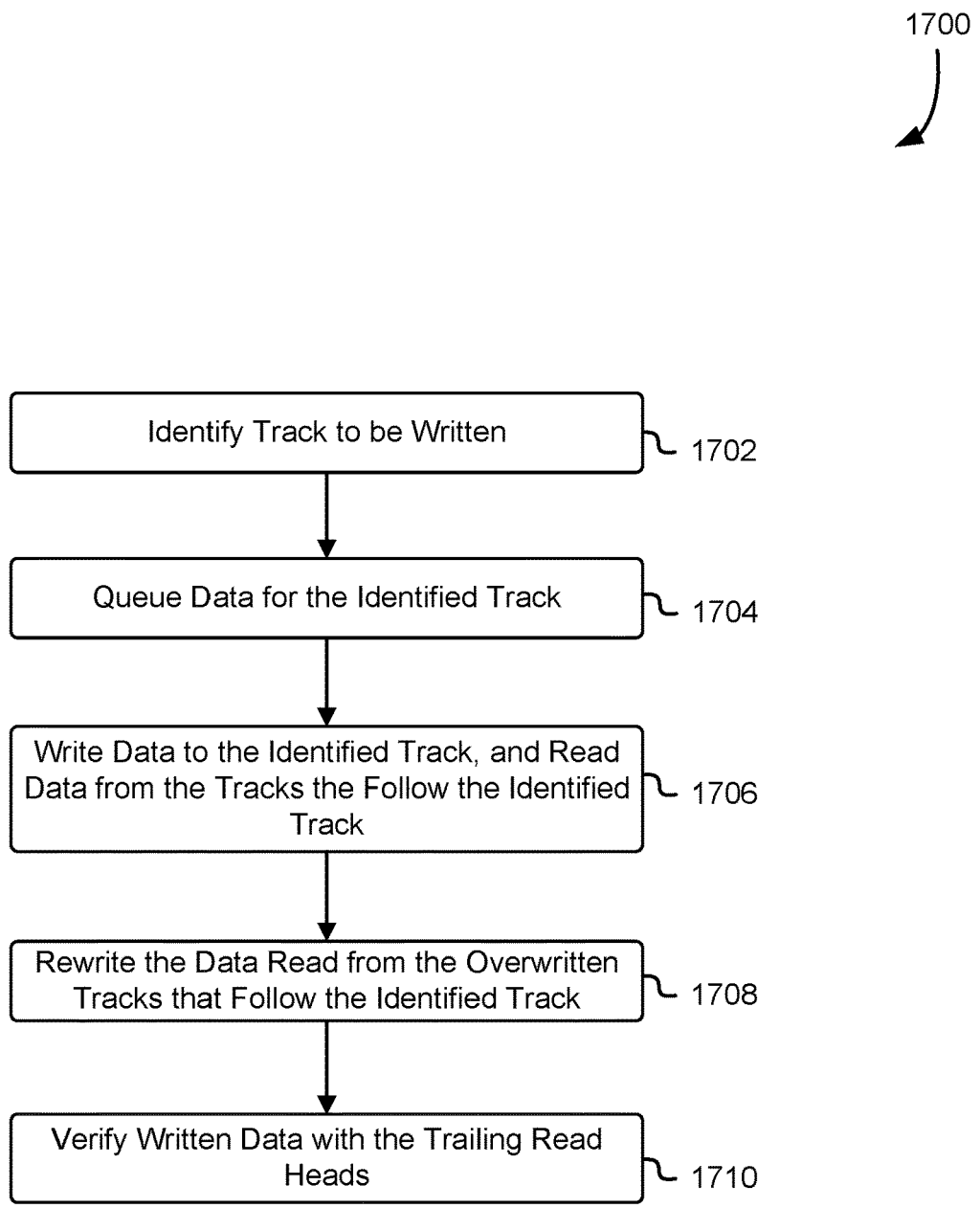
FIG. 17 shows an illustrative example of a process that, as a result of being performed by a tape drive controller, writes data to a subset of tracks in a band of tracks recorded in a shingled pattern, in an embodiment.

FIG. 17 shows an illustrative example of a process that as a result of being performed by a tape drive writes data to a subset of tracks in a band of tracks recorded in a shingled pattern, in an embodiment. A process 1700 begins at block 1702 with a tape drive identifying a track to be written. In some embodiments, the track is specified by a client computer system as part of a command parameter. In other embodiments, the tape drive identifies a particular physical track based on logical address information provided by the client computer system. At block 1704, the tape drive receives data to be written from the client computer system and stores it in a buffer memory on the tape drive.

Block 1706, the tape drive identifies the track that will be affected by the write operation by identifying those tracks that will be under the written track in the overlapped pattern. In general, tracks that will be under the written track will be all the tracks within the track band on one side of the track to be written. For example, in FIG. 7, if track three was to be written, tracks three, four, and five would be affected by the write operation. For those tracks that will be affected, the tape drive begins reading data in advance of the write using a corresponding set of read heads. At block 1708, while reading data from the corresponding set of read heads, data is written to the write heads on the affected tracks. Data from the client is written to the identified data track, which overwrites the subsequent track. However, the overwritten data is preserved by copying the data from the advance read head to the corresponding write head. This operation is done for each of the affected data tracks so that data is not lost.

At block 1710, the set of written data tracks passes by the set of read verification heads. The tape drive reads the data a final time and confirms that the data written matches the data read. For the identified track, the data is verified to match that supplied by the client computer system. For the affected tracks, the data is verified to match the data read by the advanced read heads.

Figure 18:
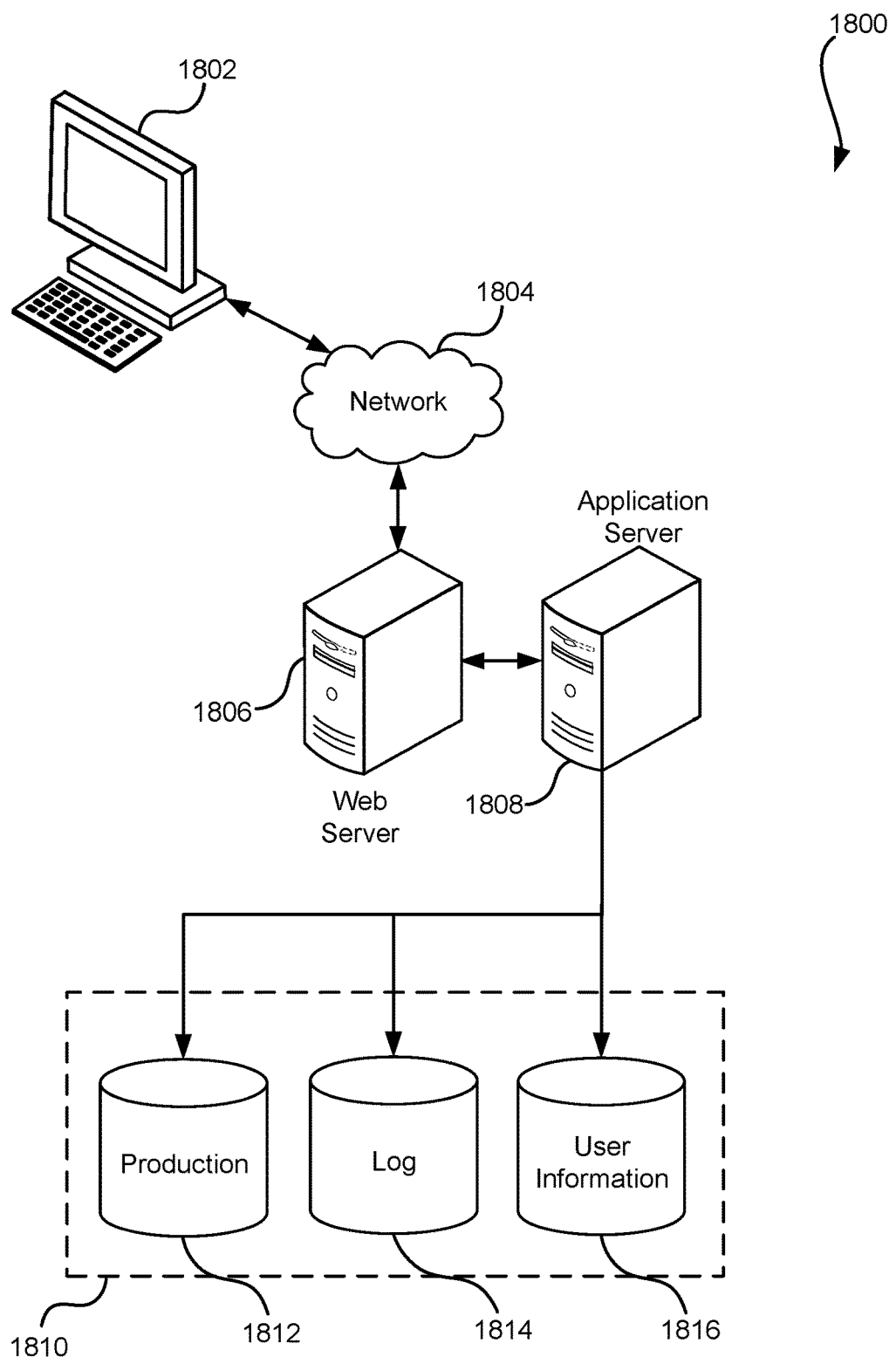
FIG. 18 illustrates a system in which various embodiments can be implemented.

FIG. 18 illustrates aspects of an example system 1800 for implementing aspects in accordance with an embodiment. As will be appreciated, although a web-based system is used for purposes of explanation, different systems may be used, as appropriate, to implement various embodiments. In an embodiment, the system includes an electronic client device 1802, which includes any appropriate device operable to send and/or receive requests, messages, or information over an appropriate network 1804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1806 for receiving requests and serving content in response thereto, although for other networks an alternative device serving a similar purpose could be used as would be apparent to one of ordinary skill in the art.

In an embodiment, the illustrative system includes at least one application server 1808 and a data store 1810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1802 and the application server 1808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1812 and user information 1816, which are used to serve content for the production side. The data store also is shown to include a mechanism for storing log data 1814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1810.

The data store 1810, in an embodiment, is operable, through logic associated therewith, to receive instructions from the application server 1808 and obtain, update or otherwise process data in response thereto, and the application server 1808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 1802. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 1800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 18. Thus, the depiction of the system 1800 in FIG. 18 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
in a pass of a magnetic tape through a tape drive,
writing first data to a location on a first data track of the magnetic tape, the first data track partially overlapping a portion of an adjacent data track on the magnetic tape;
verifying that the first data is correctly written to the magnetic tape by reading second data from the location on the first data track and verifying that the first data matches the second data; and
verifying that data on a non-overlapped portion of the adjacent track is recoverable by reading third data from the non-overlapped portion of the adjacent data track.

2. The computer-implemented method of claim 1, wherein:
the tape drive includes a head assembly that includes a write head;
the head assembly includes a first read head positioned so that the write head and first read head are capable of being positioned over the same track simultaneously; and
the head assembly includes a second read head positioned so that when the first read head is positioned over a data track, the second read head is positioned over an adjacent data track to the data track.

3. The computer-implemented method of claim 1, further comprising:
reversing the direction that the magnetic tape moves through the tape drive;
in a second pass of the magnetic tape through the tape drive,
writing fourth data to a third data track of the magnetic tape, the third data track partially overlapping a portion of the first data track on the magnetic tape;
verifying that the fourth data is correctly written to the magnetic tape by reading fifth data from the third data track and verifying that the fourth data matches the fifth data; and
verifying that data on a non-overlapped portion of the first data track is recoverable by reading sixth data from the non-overlapped portion of the first data track.

4. The computer-implemented method of claim 1, further comprising:
in the pass of the magnetic tape through the tape drive, writing fourth data to a third data track of the magnetic tape, the third data track partially overlapping a portion of the first data track on the magnetic tape;

verifying that the fourth data is correctly written to the magnetic tape by reading fifth data from the third data track and verifying that the fourth data matches the fifth data; and verifying that data on a non-overlapped portion of the first data track is recoverable by reading sixth data from the non-overlapped portion of the first data track.

5. A tape drive, comprising:
a head assembly that includes a first head, a second head, and the first head in line with the second head;
one or more processors; and
memory that stores computer-executable instructions that, if executed, cause the tape drive to:
  in a pass of a magnetic tape over the head assembly,
    write first data to a first track of the magnetic tape with the first head, the first data track overlapping at least a portion of a second track on the magnetic tape;
    read second data from the first track with the second head and verify that the first data matches the second data; and
    after writing the data to the first track, verify that original data on the second track is readable by reading the original data from a non-overlapped portion of the second track.

6. The system of claim 5, wherein:
the head assembly includes a first plurality of heads; and
the first plurality of heads are arranged in a staggered pattern such that each track written by an individual head overwrites part of an adjacent track.

7. The system of claim 6, wherein:
the head assembly includes a second plurality of heads corresponding to the first plurality of heads; and
individual heads of the second plurality of heads are used to verify data written by a corresponding head in the first plurality of heads.

8. The system of claim 6, wherein:
the head assembly includes a second plurality of heads corresponding to the first plurality of heads;
the head assembly includes a third plurality of heads corresponding to the first plurality of heads;
individual heads of the second plurality of heads are used to verify data written by a corresponding head in the first plurality of heads when the magnetic tape is advanced in a first direction; and
individual heads of the third plurality of heads are used to verify data written by a corresponding head in the first plurality of heads when the magnetic tape is advanced in a second direction substantially opposite to the first direction.

9. The system of claim 8, wherein:
the third plurality of heads is used to read existing data that is overwritten by the first plurality of heads when the magnetic tape is advanced in the first direction; and
the second plurality of heads is used to read existing data that is overwritten by the first plurality of heads when the magnetic tape is advanced in the second direction.

10. The system of claim 9, wherein the existing data is written to one or more of the first plurality of heads.

11. The system of claim 5, wherein:
the head assembly includes a servo head;
the servo head reads position information from the magnetic tape; and
the tape drive positions the head assembly based on the position information.

12. The system of claim 5, wherein the width of the non-overlapped portion of the second track is approximately the minimum width of a data track that can be read by the second head and a third head.

13. A non-transitory computer-readable storage medium having stored thereon executable instructions that, as a result of being executed by one or more processors of a computer system, cause the computer system to at least:
  in a pass of a magnetic tape through a tape drive,
    write first data to a first data track of the magnetic tape, the first data track partially overlapping a portion of the width of a second data track on the magnetic tape, and the width of the written first data track is greater than a non-overlapped portion of the second data track; and
    verify that the first data is correctly written to the magnetic tape by reading second data from the first data track and verifying that the first data matches the second data.

14. The non-transitory computer-readable storage medium of claim 13, wherein the instructions further comprise instructions that, as a result of being executed by the one or more processors, cause the computer system to:
  in the pass of the magnetic tape through the tape drive, verify that data on a non-overlapped portion of the adjacent track is recoverable by reading third data from the non-overlapped portion of the adjacent data track.

15. The non-transitory computer-readable storage medium of claim 14, wherein the instructions further comprise instructions that, as a result of being executed by the one or more processors, cause the computer system to verify the data on the non-overlapped portion of the adjacent track using verification information written on the adjacent track the magnetic tape.

16. The non-transitory computer-readable storage medium of claim 15, wherein:
the verification information includes a checksum, hash, or message authentication code for the data on the non-overlapped portion of the adjacent track; and
the verification information includes a track identifier of the adjacent track.

17. The non-transitory computer-readable storage medium of claim 13, wherein the instructions further comprise instructions that, as a result of being executed by the one or more processors, cause the computer system to:
  determine that the first data is not correctly written to the magnetic tape;
  write an additional copy of the first data to the first data track of the magnetic tape, the first data track partially overlapping a portion of the width of the second data track on the magnetic tape; and
  verify that the additional copy of the first data is correctly written to the magnetic tape by reading the additional copy of the first data from the first data track.

18. The non-transitory computer-readable storage medium of claim 13, wherein the instructions further comprise instructions that, as a result of being executed by the one or more processors, cause the computer system to:
  in the pass of the magnetic tape through the tape drive, use a plurality of read heads to verify that the first data is correctly written to the magnetic tape and that existing data on the magnetic tape is unchanged.

19. The non-transitory computer-readable storage medium of claim 13, wherein the instructions further comprise instructions that, as a result of being executed by the one or more processors, cause the computer system to:

implement a command interface accessible to a client computer system; and obtain the first data from the client computer system.

20. The non-transitory computer-readable storage medium of claim 19, wherein the instructions further comprise instructions that, as a result of being executed by the one or more processors, cause the computer system to:

read original data that is overwritten by writing the first data; and provide the original data to the client computer system via the command interface.

* * * * *